US007265179B2

(12) United States Patent
Jin et al.

(10) Patent No.: US 7,265,179 B2
(45) Date of Patent: Sep. 4, 2007

(54) COATING COMPOSITIONS, ARTICLES, AND METHODS OF COATING ARTICLES

(75) Inventors: Ren-Zhi Jin, Irvine, CA (US); Andreas Schneider, Fullerton, CA (US); Mark Sollberger, Irvine, CA (US)

(73) Assignee: SDC Technologies, Inc., Anaheim, CA (US)

( * ) Notice: Subject to any disclaimer, the term of this patent is extended or adjusted under 35 U.S.C. 154(b) by 0 days.

(21) Appl. No.: 11/278,363

(22) Filed: Mar. 31, 2006

(65) Prior Publication Data

US 2007/0104968 A1 May 10, 2007

Related U.S. Application Data

(63) Continuation-in-part of application No. PCT/US2005/036458, filed on Oct. 12, 2005.

(60) Provisional application No. 60/618,014, filed on Oct. 12, 2004.

(51) Int. Cl.
*B32B 27/28* (2006.01)
*C08K 3/20* (2006.01)
*C08L 83/06* (2006.01)

(52) U.S. Cl. ...................... 524/588; 428/447; 525/474; 525/476; 525/477

(58) Field of Classification Search ...................... None
See application file for complete search history.

(56) References Cited

U.S. PATENT DOCUMENTS 3,922,436 A * 11/1975 Bell et al.
4,839,443 A * 6/1989 Akutsu et al.
5,618,626 A * 4/1997 Nagashima et al.
6,001,163 A * 12/1999 Havey et al. .......... 106/287.13
6,479,057 B2 * 11/2002 Allwohn et al. ............ 424/401
2005/0171318 A1 * 8/2005 Okuhira et al.
2006/0159923 A1 * 7/2006 Becker-Willinger et al.

FOREIGN PATENT DOCUMENTS

DE 19649183 A1 * 4/1998
EP 845489 A2 * 6/1998
JP 01-26877 A * 10/1989

OTHER PUBLICATIONS

CAPLUS accession No. 1992:61613 for the Materials Science Monographs article by Amberg-Schwab et al., vol. 67, 1991,□□including Chemical abstracts registry Nos. 93642-68-3 and 2530-83-3, four pages.*

* cited by examiner

*Primary Examiner*—Robert Sellers
(74) *Attorney, Agent, or Firm*—Calfee, Halter & Griswold LLP

(57) ABSTRACT

Coating compositions, articles, and methods of coating articles are provided. The coating compositions and methods provide abrasion resistant formable coatings when cured on a substrate. The articles can be formed after the coating compositions are applied to a substrate and cured. Abrasion resistant, tintable coatings are also provided.

32 Claims, No Drawings

COATING COMPOSITIONS, ARTICLES, AND METHODS OF COATING ARTICLES

CROSS REFERENCE TO RELATED APPLICATIONS

This application is a continuation-in-part of and claims priority to and any other benefit of PCT Application No. PCT/US2005/036458, filed Oct. 12, 2005, which claims priority to and any other benefit of U.S. Provisional Application Ser. No. 60/618,014, filed Oct. 12, 2004, the entirety of both which are incorporated by reference herein. This application is related to PCT Application entitled "Coating Compositions, Articles, and Methods of Coating Articles" filed on Mar. 31, 2006.

FIELD OF THE INVENTION

The present invention relates to coating compositions, articles, and methods of coating articles. More particularly, the present invention relates to stable coating compositions that provide abrasion resistant formable coatings when cured on a substrate. Additionally, the present invention relates to stable coating compositions that provide abrasion resistant, environmentally resistant, tintable coatings when cured on a substrate.

BACKGROUND

Glass glazing can be substituted with transparent materials, such as plastics, which do not shatter or are more resistant to shattering than glass. For example, transparent materials made from synthetic organic polymers are utilized in public transportation vehicles such as trains, buses, taxis and airplanes. Lenses for eye glasses and other optical instruments, as well as glazing for large buildings, can also employ shatter-resistant, transparent plastics. Additionally, the lighter weight of these plastics in comparison to glass can be a further advantage, especially in the transportation industry where the weight of the vehicle is a major factor in its fuel economy.

While transparent plastics provide the major advantage of being more resistant to shattering, lighter than glass, and having design flexibility, a serious drawback lies in the ease with which these plastics mar and scratch due to everyday contact with abrasives such as dust or cleaning equipment. Marring results in impaired visibility and poor aesthetics, and often requires replacement of the glazing or lens or the like.

To improve the abrasion resistance of plastics, mar-resistant coatings have been developed. The main disadvantage of these abrasion resistant compositions is that they may not be formable after curing. Poor formability means that bending or working a coated article will often lead to cracking or crazing of the coating. As a consequence, articles must be coated after forming, which may entail time delays and shipment of uncoated articles which may be inadvertently abraded in transit.

Additionally, it is often desired to provide tintable coatings that possess abrasion resistance. In particular, these coatings can be useful for tinted window applications and for ophthalmic applications. Many known coating compositions do not readily allow for a tint to be added to the coating composition after the coating composition has cured on the substrate. The ability to add a tint to such a cured coating composition is highly desirous.

Thus, there remains a need in the art for coatings having good abrasion resistance and formability. In addition, there remains a need in the art for coatings exhibiting abrasion resistance and tintability.

SUMMARY OF THE INVENTION

In accordance with embodiments of the present invention, compositions which, when applied to a substrate and cured, provide an abrasion resistant formable coating on the substrate are provided. The compositions can comprise an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to about 1:10; and an amount of water sufficient to hydrolyze the epoxy functional silane, the diol functional organopolysiloxane, and the multifunctional crosslinker.

In one example, the at least one of the epoxy functional silane and the diol functional organopolysiloxane is present in a molar ratio to the multifunctional crosslinker of about 2:1 to about 1:2. In another example, the coating can be formed to a radius from about 1 inch to less than about 10 inches on a polycarbonate substrate. In a further example, the coating can be formed to a radius from about 3 inches to about 5 inches on a polycarbonate substrate.

In another example, the coating has a Taber number of less than about 10 percent after 50 revolutions of a Taber wheel or a Taber number of less than about 2 percent after 50 revolutions of a Taber wheel. In another example, the coating has a Taber number of less than about 45 percent after 200 revolutions of a Taber wheel or a Taber number of less than about 15 percent after 200 revolutions of a Taber wheel.

In a further example, the at least one of the epoxy functional silane and the diol functional organopolysiloxane comprises about 5 to about 93 percent by weight of the solids of the composition, and the multifunctional crosslinker comprises about 7 to about 95 percent by weight of the solids of the composition. In another example, the at least one of the epoxy functional silane and the diol functional silane comprises about 30 to about 70 percent by weight of the solids of the composition, and the multifunctional crosslinker comprises about 30 to about 70 percent by weight of the solids of the composition. In a further example, the solvent constituent of the aqueous-organic solvent mixture comprises from about 40 to about 98 percent by weight of the composition. In yet another example, the solvent constituent of the aqueous-organic solvent mixture comprises from about 65 to about 95 percent by weight of the composition.

In one example, the solvent constituent of the aqueous-organic solvent mixture is selected from an ether, a glycol or a glycol ether, a ketone, an ester, a glycolether acetate, and combinations thereof. In another example, the solvent constituent of the aqueous-organic solvent mixture is selected from alcohols having the formula ROH where R is an alkyl group containing from 1 to about 10 carbon atoms. In another example, the solvent constituent of the aqueous-organic solvent mixture is selected from glycols, ethers, glycol ethers having the formula $R^1$—$(OR^2)_x$—$OR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

In other examples, the epoxy functional silane is represented by the formula $R^3{}_xSi(OR^4)_{4-x}$, wherein: x is an integer of 1, 2 or 3; $R^3$ is H, an alkyl group, a functionalized alkyl group, an alkylene group, an aryl group, an alkyl ether, and combinations thereof containing from 1 to about 10 carbon atoms and having at least 1 epoxy functional group; $R^4$ is H, an alkyl group containing from 1 to about 5 carbon atoms, an acetyl group, a —$Si(OR^5)_{3-y}R^6{}_y$ group where y is an integer of 0, 1, 2, or 3, and combinations thereof; $R^5$ is H, an alkyl group containing from 1 to about 5 carbon atoms, an acetyl group, or another —$Si(OR^5)_{3-y}R^6{}_y$ group and combinations thereof, and $R^6$ is H, an alkyl group, a functionalized alkyl group, an alkylene group, an aryl group, an alkyl ether, and combinations thereof containing from 1 to about 10 carbon atoms.

In further examples, the aqueous-organic solvent mixture further comprises an effective amount of a leveling agent to spread the aqueous-organic solvent mixture on the substrate and provide a substantially uniform contact of the aqueous-organic solvent mixture with the substrate. In another example, the composition further comprises at least one catalyst, at least one ultraviolet stabilizer, or at least one surfactant, and combinations thereof.

In other embodiments of the present invention, compositions which, when applied to a substrate and cured, provide an abrasion resistant formable coating on the substrate are provided. The compositions can comprise an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to about 1:10; and an amount of water sufficient to hydrolyze the diol functional organopolysiloxane and the multifunctional crosslinker. In one example, the aqueous-organic solvent mixture further comprises hydrolysis products and partial condensates of an epoxy functional silane and the at least one multifunctional crosslinker.

In accordance with further embodiments of the present invention, compositions which, when applied to a substrate and cured, provide an abrasion resistant formable coating on the substrate are provided. The compositions can comprise an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker of from about 10:1 to about 1:10; and an amount of water sufficient to hydrolyze the epoxy functional silane and the multifunctional crosslinker, wherein the composition contains an amount of at least one of tetrafunctional silanes, disilanes, and alkyl silanes insufficient to render the coating rigid on the substrate. In one example, the aqueous-organic solvent mixture further comprises hydrolysis products and partial condensates of a diol functional organopolysiloxane and the multifunctional crosslinker.

In accordance with yet further embodiments of the present invention, compositions which, when applied to a substrate and cured, provide an abrasion resistant formable coating on the substrate are provided. The compositions can comprise an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the multifunctional crosslinker; and at least one of a tetrafunctional silane and a disilane, wherein the epoxy functional silane is present in a molar ratio to the at least one of the tetrafunctional silane and the disilane of at least about 5.5:1. In one example, the aqueous-organic solvent mixture further comprises hydrolysis products and partial condensates of a diol functional organopolysiloxane and the multifunctional crosslinker.

In another example, the tetrafunctional silane has a formula of $Si(OR^9)_4$, where $R^9$ is H, an alkyl group containing from 1 to about 5 carbon atoms and ethers thereof, an $(OR^9)$ carboxylate, a —$Si(OR^{10})_3$ group where $R^{10}$ is a H, an alkyl group containing from 1 to about 5 carbon atoms and ethers thereof, an $(OR^{10})$ carboxylate, or another —$Si(OR^{10})_3$ group and combinations thereof. In a further example, the disilane has a formula of $(R^{11}O)_xR^{12}{}_{3-x}Si—R^{13}{}_y—SiR^{14}{}_{3-x}(OR^{15})_x$; wherein x is 0, 1, 2, or 3 and y is 0 or 1; wherein $R^{12}$ and $R^{14}$ comprises H, an alkyl group containing from about 1 to about 10 carbon atoms, a functionalized alkyl group, an alkylene group, an aryl group, an alkypolyether group, and combinations thereof, wherein $R^{11}$ and $R^{15}$ comprises H, an alkyl group containing from about 1 to about 10 carbon atoms, an acetyl group, and combinations thereof, wherein if y is 1 then $R^{13}$ comprises an alkylene group containing from about 1 to about 12 carbon atoms, an alkylenepolyether containing from about 1 to about 12 carbon atoms, an aryl group, an alkylene substituted aryl group, an alkylene group which may contain one or more olefins, S, or O; wherein if x is 0 then $R^{12}$ and $R^{14}$ comprises Cl or Br; and wherein if y is 0 then there is a direct silicon—silicon bond.

In accordance with additional embodiments of the present invention compositions which, when applied to a substrate and cured, provide an abrasion resistant formable coating on the substrate are provided. The compositions can comprise an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the multifunctional crosslinker; and at least one alkyl silane, wherein the epoxy functional silane is present in a molar ratio to the at least one alkyl silane of at least about 2.5:1.

In one example, the aqueous-organic solvent mixture further comprises hydrolysis products and partial condensates of a diol functional organopolysiloxane and the multifunctional crosslinker. In another example, the alkyl silane has a formula of $R^{16}{}_xSi(OR^{17})_{4-x}$ where x is a number of 1, 2 or 3; $R^{16}$ is H, or an alkyl group containing from 1 to about 10 carbon atoms, a functionalized alkyl group, an alkylene group, an aryl group an alkoxypolyether group and combinations thereof; $R^{17}$ is H, an alkyl group containing from 1 to about 10 carbon atoms, an acetyl group; and combinations thereof.

In accordance with other embodiments of the present invention, compositions which, when applied to a substrate and cured, provide an abrasion resistant and formable coating on the substrate are provided. The compositions can comprise an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to about 1:10; and an amount of water sufficient to hydrolyze the epoxy functional silane and the multifunctional crosslinker, wherein the composition does not contain tetrafunctional silanes, disilanes, and alkyl silanes. In one example, the aqueous-organic solvent mixture further comprises hydrolysis products and partial condensates of a diol functional organopolysiloxane and the multifunctional crosslinker.

In accordance with embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to about 1:10; and an amount of water sufficient to hydrolyze the epoxy functional silane, the diol functional organopolysiloxane, and the multifunctional crosslinker. In one example, at least one primer disposed on the at least one surface of the substrate between the substrate and the coating.

In accordance with further embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to about 1:10; and an amount of water sufficient to hydrolyze the diol functional organopolysiloxane and the multifunctional crosslinker.

In accordance with other embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker of from about 10:1 to about 1:10; and an amount of water sufficient to hydrolyze the epoxy functional silane and the multifunctional crosslinker, wherein the composition contains an amount of at least one of tetrafunctional silanes, disilanes, and alkyl silanes insufficient to render the coating rigid on the substrate.

In accordance with embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the multifunctional crosslinker; and at least one of a tetrafunctional silane and a disilane, wherein the epoxy functional silane is present in a molar ratio to the at least one of the tetrafunctional silane and the disilane of at least about 5.5:1.

In accordance with further embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the multifunctional crosslinker; and at least one alkyl silane, wherein the epoxy functional silane is present in a molar ratio to the at least one alkyl silane of at least about 2.5:1.

In accordance with embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to about 1:10; and an amount of water sufficient to hydrolyze the epoxy functional silane and the multifunctional crosslinker, wherein the composition does not contain tetrafunctional silanes, disilanes, and alkyl silanes.

In accordance with embodiments of the present invention, formed articles are provided. The articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to about 1:10; and an amount of water sufficient to hydrolyze the epoxy functional silane, the diol functional organopolysiloxane, and the multifunctional crosslinker. In one example, the formed article further comprises at least one primer disposed on the at least one surface of the substrate between the substrate and the coating.

In accordance with further embodiments of the present invention, formed articles are provided. The formed articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to about 1:10; and an amount of water sufficient to hydrolyze the diol functional organopolysiloxane and the multifunctional crosslinker.

In accordance with other embodiments of the present invention, formed articles are provided. The formed articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; and an amount of water sufficient to hydrolyze the epoxy functional silane and the multifunctional crosslinker, wherein the composition contains an amount of at least one of tetrafunctional silanes, disilanes, and alkyl silanes insufficient to render the coating rigid on the substrate.

In accordance with embodiments of the present invention, formed articles are provided. The articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the multifunctional crosslinker; and at least one of a tetrafunctional silane and a disilane, wherein the epoxy functional silane is present in a molar ratio to the at least one of the tetrafunctional silane and the disilane of at least about 5.5:1.

In accordance with other embodiments of the present invention, formed articles are provided. The formed articles comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the multifunctional crosslinker; and at least one alkyl silane, wherein the epoxy functional silane is present in a molar ratio to the at least one alkyl silane of at least about 2.5:1.

In accordance with embodiments of the present invention, formed articles are provided. The formed articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to about 1:10; and an amount of water sufficient to hydrolyze the epoxy functional silane and the multifunctional crosslinker, wherein the composition does not contain tetrafunctional silanes, disilanes, and alkyl silanes.

In accordance with embodiments of the present invention processes for providing abrasion resistant formable coatings are provided. The processes can comprise applying a coating composition to a substrate; and curing the coating composition, wherein the coating composition comprises: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to about 1:10; and an amount of water sufficient to hydrolyze the epoxy functional silane, the diol functional organopolysiloxane, and the multifunctional crosslinker. In one example, the process further comprises the step of forming the coated substrate. In another example, the process further comprises applying a primer to the substrate prior to applying the coating composition to the substrate on the primer.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to about 1:10; and an amount of water sufficient to hydrolyze the diol functional organopolysiloxane and the multifunctional crosslinker.

In accordance with embodiments of the present invention, processes for providing an abrasion resistant formable coatings are provided. The processes can comprise applying a coating composition to a substrate; and curing the coating composition, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; and an amount of water sufficient to hydrolyze the epoxy functional silane and the multifunctional crosslinker, wherein the composition contains an amount of at least on of tetrafunctional silanes, disilanes, and alkyl silanes insufficient to render the coating rigid on the substrate.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; and an amount of water sufficient to hydrolyze the epoxy functional silane and the multifunctional crosslinker; and at least one of a tetrafunctional silane and a disilane, wherein the epoxy functional silane is present in a molar ratio to the at least one of the tetrafunctional silane and the disilane of at least about 5.5:1.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; and an amount of water sufficient to hydrolyze the epoxy functional silane and the multifunctional crosslinker; and at least one alkyl silane, wherein the epoxy functional silane is present in a molar ratio to the at least one alkyl silane of at least about 2.5:1.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to about 1:10; and an amount of water sufficient to hydrolyze the epoxy functional silane and the multifunctional crosslinker, wherein the composition does not contain tetrafunctional silanes, disilanes, and alkyl silanes.

In accordance with yet other embodiments of a present invention compositions which, when applied to a substrate and cured, provide transparent, tintable coatings on said substrate are provided. The compositions comprise an aqueous-organic solvent mixture having hydrolysis products and partial condensates of at least one of an epoxy functional silane and a diol functional organopolysiloxane and at least one multifunctional crosslinker, wherein said multifunctional crosslinker comprises a silylated multifunctional anhydride, and wherein said at least one of said epoxy functional silane and said diol functional organopolysiloxane is present in a molar ratio to said multifunctional crosslinker from about 10:1 to about 1:10; an amount of water sufficient to hydrolyze said at least one of said epoxy functional silane and said diol functional organopolysiloxane and said multifunctional crosslinker; and a blocked isocyanate. In some examples, the at least one of the epoxy functional silane and the diol functional organopolysiloxane is present in a molar ratio to the multifunctional crosslinker of about 6:1 to about 1:6. In other examples, the at least one of the epoxy functional silane and the diol functional organopolysiloxane is present in a molar ratio to the multifunctional crosslinker of about 3:1 to about 1:3. In further embodiments, the blocked isocyanate comprises from about 1 percent by weight to about 30 percent by weight of the solids of the coating composition, or from about 2 percent by weight to about 15 percent by weight of the solids of the coating composition, or from about 3 percent by weight to about 10 percent by weight of the solids of the coating composition.

In some examples, the blocked isocyanate is selected from at least one of Desmodur B1 3175, Desmodur B1 3272, Desmodur B1 3370, Desmodur B1 3475, Desmodur B1 4265, Trixene B1 7982, Trixene 7983, Trixene B1 7984, Trixene B1 7980, Trixene B1 7960, and Trixene B1 7950. In other examples, the blocked isocyanate comprises Desmodur B1 3175. In further examples, the coating has a Bayer number of greater than about 1.5 or greater than about 2. In yet further examples, the coating exhibits no adhesion failure or cracking under QUV method A and QUV method B test conditions for at least 72 hours or at least 120 hours. In some instances, the solvent constituent of the aqueous-organic solvent mixture comprises from about 40 to about 98 percent by weight of the composition. In some cases, the solvent constituent of the aqueous-organic solvent mixture is selected from an ether, a glycol or a glycol ether, a ketone, an ester, a glycolether acetate, alcohols having the formula ROH where R is an alkyl group containing from 1 to about 10 carbon atoms, and mixtures thereof. In other examples, the solvent constituent of the aqueous-organic solvent mixture is selected from glycols, ethers, glycol ethers having the formula $R^1$—$(OR^2)_x$—$OR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

In yet further examples, the composition further comprises at least one of tetrafunctional silanes, disilanes, and alkyl silanes. In another examples, the composition further comprises colloidal silica. In some cases, the epoxy functional silane is represented by the formula $R^3_x Si(OR^4)_{4-x}$, wherein: x is an integer of 1, 2 or 3; $R^3$ is H, an alkyl group, a functionalized alkyl group, an alkylene group, an aryl group, an alkyl ether, and combinations thereof containing from 1 to about 10 carbon atoms and having at least 1 epoxy functional group;

$R^4$ is H, an alkyl group containing from 1 to about 5 carbon atoms, an acetyl group, a —$Si(OR^5)_{3-y}R^6_y$ group where y is an integer of 0, 1, 2, or 3, and combinations thereof; $R^5$ is H, an alkyl group containing from 1 to about 5 carbon atoms, an acetyl group, or another —$Si(OR^5)_{3-y}R^6_y$ group and combinations thereof, and $R^6$ is H, an alkyl group, a functionalized alkyl group, an alkylene group, an aryl group, an alkyl ether, and combinations thereof containing from 1 to about 10 carbon atoms.

In accordance with yet additional embodiments, compositions which, when applied to a substrate and cured, provides transparent, tintable coatings on the substrate are provided. The compositions comprise an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to 1:10; an amount of water sufficient to hydrolyze the diol functional organopolysiloxane and the multifunctional crosslinker; and a blocked isocyanate. In some examples, the aqueous-organic solvent mixture further comprises hydrolysis products and partial condensates of an epoxy functional silane and the at least one multifunctional crosslinker.

In accordance with additional embodiments, articles are provided. The articles comprise a substrate and a tintable coating formed on at least one surface of the substrate by curing a coating composition, comprising: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10; an amount of water sufficient to hydrolyze the at least one of the epoxy functional silane and the diol functional organopolysiloxane and the multifunctional crosslinker; and a blocked isocyanate. In some examples, the articles further comprise at least one primer disposed on the at least one surface of the substrate between the substrate and the coating. In some cases, the at least one primer comprises a polyurethane dispersion based primer or a polyurethane dispersion based primer having a crosslinking agent. In some examples, the crosslinking agent is selected from a blocked isocyanate, aziridine resin, epoxy resin, and melamine resin. In further examples, the polyurethane dispersion based primer further comprises an ultraviolet light absorber. In some examples, the crosslinking agent comprises about 1 percent to about 30 percent by weight of the solids of the polyurethane dispersion based primer.

In further examples, the tintable coating has a thickness between about 0.2 µm to about 20 µm, or between about 1.5 µm to about 10 µm, or between about 2.5 µm to about 7 µm. In other examples, the substrate is selected from acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, and poly(diethylene glycol-bis-allyl carbonate). In some instances, the substrate comprises a lens.

In accordance with further embodiments, articles are provided. The articles comprise a substrate and a tintable coating formed on at least one surface of the substrate by curing a coating composition, comprising: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to 1:10; an amount of water sufficient to hydrolyze the diol functional organopolysiloxane and the multifunctional crosslinker; and a blocked isocyanate. In some instances, the coating composition includes at least one of a tetrafunctional silane and a disilane, and wherein the epoxy functional silane is present in a molar ratio to the at least one of the tetrafunctional silane and the disilane of at least about 5.5:1.

In accordance with yet additional embodiments, articles are provided. The articles comprise: a substrate, a primer disposed on at least one surface of the substrate, and a tintable coating formed on at least a portion of the primer curing a coating composition, wherein: the coating composition comprises: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10; and an amount of water sufficient to hydrolyze the at least one of the epoxy functional silane and the diol functional organopolysiloxane and the multifunctional crosslinker; the primer comprises a polyurethane dispersion based primer having a crosslinking agent. In some examples, the tintable coating exhibits no adhesion failure or cracking under QUV method A and QUV method B test conditions for at least about 72 hours.

In accordance with still further embodiments, articles are provided. The articles comprise a substrate, a primer disposed on at least one surface of the substrate, and a tintable coating formed on at least a portion of the primer curing a coating composition, wherein: the coating composition comprises: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to 1:10; an amount of water sufficient to hydrolyze the diol functional organopolysiloxane and the multifunctional crosslinker; the primer comprises a polyurethane dispersion based primer having a crosslinking agent.

In accordance with other embodiments, processes for tinting a transparent, tintable, abrasion-resistant coating that is coated on at least one surface of a substrate are provided. The processes comprise contacting at least one surface of a substrate with a coating composition that forms a transparent, tintable, abrasion-resistant coating upon curing, the coating composition comprising: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10; and an amount of water sufficient to hydrolyze the at least one of the epoxy functional silane and the diol functional organopolysiloxane and the multifunctional crosslinker; curing the coating composition on the substrate to form a transparent, tintable, abrasion resistant cured coating; and tinting the cured coating by immersing the coated surface of the substrate in a dye bath for a period of time sufficient for the cured coating to absorb or transmit to the substrate a desired amount of dye.

In some examples, the coating composition further comprises a blocked isocyanate. In other examples, the processes further comprise applying a primer to the substrate prior to applying the coating composition to the substrate on the primer. In yet other instances, the primer comprises a polyurethane dispersion based primer or a polyurethane dispersion based primer having a crosslinking agent.

In accordance with even further embodiments, processes for tinting a transparent, tintable, abrasion-resistant coating that is coated on at least one surface of a substrate are provided. The processes comprise: contacting at least one surface of a substrate with a coating composition that forms a transparent, tintable, abrasion-resistant coating upon curing, the coating composition comprising: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to 1:10; and an amount of water sufficient to hydrolyze the diol functional organopolysiloxane and the multifunctional crosslinker; curing the coating composition on the substrate to form a transparent, tintable, abrasion resistant cured coating; and tinting the cured coating by immersing the coated surface of the substrate in a dye bath for a period of time sufficient for the cured coating to absorb or transmit to the substrate a desired amount of dye.

DETAILED DESCRIPTION OF EMBODIMENTS OF THE INVENTION

The present invention will now be described with occasional reference to specific embodiments of the invention. This invention may, however, be embodied in different forms and should not be construed as limited to the embodiments set forth herein. Rather, these embodiments are provided so that this disclosure will be thorough and complete.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise expressly indicated, all numbers expressing quantities of ingredients, properties such as molecular weight, reaction conditions, and so forth as used in the description and claims are to be understood as being modified in all instances by the term "about." Accordingly, unless otherwise indicated, the numerical properties set forth in the following description and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The present invention relates to stable coating compositions which, when applied to a variety of substrates and cured, form abrasion resistant, formable coatings. For purposes of defining and describing the present invention, the term "stable" shall be understood as referring to coating compositions that are useable for an amount of time suitable for a particular application. In addition, the present invention relates to coated articles, formed coated articles, and methods of forming coated articles. The coated articles can be formed in any suitable manner. For example, the coated articles can be thermoformed. "Thermoforming" is a well known term in the plastics art describing the process of shaping thermoplastic sheets by heating them until softened, then forming the softened sheets into desired shapes using any suitable procedure such as molding, jigging, or vacuum forming.

In other embodiments, the present invention relates to tintable coating compositions providing tintability to substrates having substantially transparent coating compositions thereon, methods for tinting such coated substrates as well as coating compositions that are tintable, and articles coated with such a coating composition. More specifically, the present invention provides substantially transparent coating compositions having good abrasion resistance, good adhesion to substrates used in the ophthalmic industry and other tintable coating or substrate industries, and tintability/dyeability when applied to lenses and cured.

In accordance with embodiments of the present invention, a stable coating composition that forms an abrasion resistant, formable coating is provided. The coating composition is cured to form a transparent coating on a substrate. The coating composition comprises an aqueous-organic solvent mixture having hydrolysis products and partial condensates of at least one of at least one epoxy functional silane and at least one diol functional organopolysiloxane, or combinations thereof and at least one multifunctional crosslinker to form a cured organopolysiloxane coating on a substrate. The at least one of the epoxy functional silane and the diol functional organopolysiloxane is present in a molar ratio to the multifunctional crosslinker of between about 10:1 to about 1:10. In one example, the at least one of the epoxy functional silane and the diol functional organopolysiloxane can be present in a molar ratio to the multifunctional crosslinker of about 2:1 to about 1:2.

In one example, the multifunctional crosslinker is selected from multifunctional carboxylic acids, multifunctional anyhydrides, silylated multifunctional carboxylic acids, and silylated multifunctional anyhydrides, and combinations thereof. In another example, the multifunctional crosslinker is at least one silylated multifunctional anhydride or at least one silylated multifunctional carboxylic acid. The coating composition also contains an amount of water sufficient to hydrolyze the at least one of the epoxy functional silane and the diol functional organopolysiloxane and the multifunctional crosslinker.

The solvent component of the aqueous-organic solvent mixture can be present in any suitable amount. For example, the solvent component of the aqueous-organic solvent mixture comprises about 40 to about 98 percent of the coating composition by weight. In another example, the solvent component of the aqueous-organic solvent mixture comprises about 65 to about 95 percent of the coating composition by weight. It will be understood by those having skill in the art that at least a part of the solvent component of the aqueous-organic solvent mixture can be formed as hydrolysis by-products of the reactions of the coating compositions. The at least one of the epoxy functional silane and diol functional organopolysiloxane can be present in any suitable amount. For example, the at least one of the epoxy functional silane and diol functional organopolysiloxane comprises about 5 to about 93 percent by weight of the total solids of the composition. In another example, the at least one of the epoxy functional silane and diol functional organopolysiloxane comprises about 30 to about 70 percent by weight of the total solids of the coating composition. The multifunctional crosslinker can be present in any suitable amount. In one example, the multifunctional crosslinker comprises about 7 to about 95 percent by weight of the total solids of the composition. In another example, the multifunctional crosslinker comprises about 30 to about 70 percent by weight of the total solids of the coating composition.

In another embodiment of the present invention, the coating composition may include tetrafunctional silanes, disilanes, or other alkyl silanes that are not epoxy functional. However, the tetrafunctional silanes, disilanes, and other alkyl silanes are present in amounts insufficient to render the cured coating rigid. For purposes of defining and describing the present invention, the term "rigid" shall be understood as referring to coatings that are not formable as defined herein. In one example, the coating composition has a molar ratio of the at least one epoxy functional silane to tetrafunctional silane of at least about 5.5:1. In a further example, the coating composition has a molar ratio of the at least one epoxy functional silane to disilane of at least about 5.5:1. In another example, the coating composition has a molar ratio of the at least one epoxy functional silane to alkyl silane of at least about 2.5:1. The amount of tetrafunctional silanes, disilanes, and other alkyl silanes that are not epoxy functional that are incorporated into the coating compositions of the present invention can vary widely and will generally depend on the desired properties of the cured coating produced from the coating compositions, as well as the desired stability of the coating compositions. The tetrafunctional silanes, disilanes, and the alkyl silanes that are not epoxy functional can improve abrasion resistance, chemical resistance, and the optical properties of the cured coatings. In other embodiments of the present invention, the coating composition may include other additives such as anti-fog components, leveling agents, catalysts, etc., as will be further described herein.

For testing abrasion resistance of coated substrates, any of a number of quantitative test methods may be employed, including the Taber Test (ASTM D-4060), the Tumble Test, and the Oscillating Sand Test (ASTM F735-81). In addition, there are a number of qualitative test methods that may be used for measuring abrasion resistance, including the Steel Wool Test and the Eraser Test. In the Steel Wool Test and the Eraser Test, sample coated substrates are scratched under reproducible conditions (constant load, frequency, etc.). The scratched test samples are then compared and rated against standard samples. A semi-quantitative application of these test methods involves the use of an instrument, such as a Spectrophotometer or a Colorimeter, for measuring the scratches on the coated substrate as a haze gain.

The measured abrasion resistance of a cured coating on a substrate, whether measured by the Taber Test, Steel Wool Test, Eraser Test, Tumble Test, Bayer Test etc. is a function, in part, of the cure temperature, cure time, coating thickness, and substrate. In general, higher temperatures and longer cure times result in higher measured abrasion resistance. Normally, the cure temperature and cure time are selected for compatibility with the substrate. However, sometimes less than optimum cure temperatures and cure times are used due to process and/or equipment limitations. It will be recognized by those skilled in the art that other variables, such as coating thickness and the nature of the substrate, will also have an effect on the measured abrasion resistance. In general, for each type of substrate and for each coating composition there will be an optimum coating thickness. The optimum cure temperature, cure time, coating thickness, and the like, can be readily determined empirically by those skilled in the art.

The Taber Abrasion test is performed with a Teledyne Model 5150 Taber Abrader (Taber Industries, North Tonawanda, N.Y.) with a 500 g auxiliary load weight and with CS-10F wheels (Taber Industries, North Tonawanda, N.Y.). Prior to the measurement, the wheels are refaced with the ST-11 refacing stone (Taber Industries, North Tonawanda, N.Y.). The refacing is performed by 25 revolutions of the CS-10F wheels on the refacing stone. The initial haze of the sample is recorded 4 times with a Haze-gard Plus (BYK-Gardner, Columbia, Md.) equipped with a Taber Abrasion holder (BYK-Gardner, Columbia, Md.). After 50 cycles of the CS-10F wheels on the sample, the haze is recorded again 4 times with a Haze-gard Plus (BYK-Gardner, Columbia, Md.) equipped with a Taber Abrasion holder (BYK-Gardner, Columbia, Md.). The average haze is then determined for the initial haze reading, the haze reading after 50 cycles, and after 200 cycles using the new CS-10F wheels available at least as early as July 2003. The difference between the averaged haze readings at 50 and 200 cycles and the initial haze reading is then reported.

The Taber method is considered a semi-quantitative method for measuring abrasion resistance. The precision and accuracy of the method is dependent on a number of factors, including the condition of the CS-10F test wheels. Changes in the condition of the CS-10F test wheels can have a significant affect on the outcome of an abrasion resistance test. For example, a recent change made by Taber Industries in the composition of the CS-10F wheels changed the haze gain on standard samples from 1% haze and 5% haze at 100 and 500 cycles (reported as 1%/5%) respectively, to 7% and 25%, respectively. Throughout the testing conducted herein, all of the samples were tested with the same set of new CS-10F Taber wheels. In accordance with embodiments of the present invention, the coatings can have Taber numbers of less than about 30%, less than about 10%, or less than about 5% for 50 cycles. In accordance with other embodiments of the present invention, the coatings can have Taber numbers of less than about 2% for 50 cycles. In other examples, the coatings can have Taber numbers of less than about 45%, less than about 30%, or less than about 15% for 200 cycles.

The formability of the coatings can be tested in the following manner. An oven with a glass plate is preheated to 165° C. A 2"×7" coated ¼" Lexan polycarbonate (¼" Lexan PC, Regal Plastics, Santa Fe Springs, Calif.) test sample is placed flat on the glass plate and heated at 165° C. for 18 min. The thickness of the coating can be from about 1–20 microns or about 2–10 microns. The sample is removed from the oven and immediately placed on a cylindrical mandrel. The formability of the sample is rated by determining the minimal radius of the mandrel where no cracking, flaking, or detachment of the coating is observed. For purposes of defining and describing the present invention, the terms "formable" and "formability" shall be understood as referring to cured coatings that can be bent at a radius of less than about 10 inches, in accordance with the above procedure. In one example, the cured coatings can be bent at a radius of between about 3 to about 5 inches in accordance with the above procedure without cracking or crazing of the coating.

The presence of water in an aqueous-organic solvent mixture is needed to form hydrolysis products of the silane components of the mixture. The actual amount of water can vary widely. Enough water is needed to provide a suitably homogeneous coating mixture of hydrolysis products and partial condensates of the silane components of the coating composition with the other added components. It will be recognized by those skilled in the art that this amount of water can be determined empirically.

The solvent constituent of the aqueous-organic solvent mixture of the coating compositions of the present invention can be any solvent or combination of solvents which are compatible with the components of the coating composition including, but not limited to, an epoxy functional silane, diol functional organopolysiloxane, a silane which is not epoxy functional, a tetrafunctional silane, a disilane, and a multifunctional crosslinker, or any combinations thereof. For example, the solvent constituent of the aqueous-organic solvent mixture may be water, an alcohol, an ether, a glycol or a glycol ether, a ketone, an ester, a glycolether acetate, and combinations thereof. Suitable alcohols can be represented by the formula ROH where R is an alkyl group containing from 1 to about 10 carbon atoms. Some examples of alcohols useful in the application of this invention are methanol, ethanol, propanol, isopropanol, butanol, isobutanol, secondary butanol, tertiary butanol, cyclohexanol, pentanol, octanol, decanol, and mixtures thereof.

Suitable glycols, ethers, glycol ethers can be represented by the formula $R^1$—$(OR^2)_x$—$OR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

Examples of glycols, ethers and glycol ethers having the above defined formula include, but are not limited to, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol and combinations thereof. In addition to the above, cyclic ethers such as tetrahydrofuran and dioxane are suitable ethers for the aqueous-organic solvent mixture.

Examples of ketones suitable for the aqueous-organic solvent mixture include, but are not limited to, acetone, diacetone alcohol, methyl ethyl ketone, cyclohexanone, methyl isobutyl ketone and combinations thereof. Examples of esters suitable for the aqueous-organic solvent mixture include, but are not limited to, ethyl acetate, n-propyl acetate, n-butyl acetate and combinations thereof. Examples of glycolether acetates suitable for the aqueous-organic solvent mixture include, but are not limited to, propylene glycol methyl ether acetate, dipropylene glycol methyl ether acetate, ethyl 3-ethoxyproprionate, ethylene glycol ethyl ether acetate and combinations thereof.

Any suitable epoxy functional silane, diol functional organopolysiloxane from a hydrolyzed epoxy functional silane, or combinations thereof can be used in the coating compositions of the present invention. For example, the epoxy functional silane or diol functional organopolysiloxane can be any epoxy functional silane or diol functional organopolysiloxane which is compatible with the multifunctional carboxylic acid. For example, such epoxy functional silanes are represented by the formula $R^3_x Si(OR^4)_{4-x}$ where x is an integer of 1, 2 or 3, $R^3$ is H, an alkyl group, a functionalized alkyl group, an alkylene group, an aryl group, an alkyl ether, and combinations thereof containing from 1 to about 10 carbon atoms and having at least 1 epoxy functional group, and $R^4$ is H, an alkyl group containing from 1 to about 5 carbon atoms, an acetyl group, a —Si$(OR^5)_{3-y}R^6_y$ group where y is an integer of 0, 1, 2, or 3, and combinations thereof where $R^5$ is H, an alkyl group containing from 1 to about 5 carbon atoms, an acetyl group, or another —Si$(OR^5)_{3-y}R^6_y$ group and combinations thereof, and $R^6$ is H, an alkyl group, a functionalized alkyl group, an alkylene group, an aryl group, an alkyl ether, and combinations thereof containing from 1 to about 10 carbon atoms which may also contain an epoxy functional group.

In another example, the diol functional organopolysiloxane is the product of a ring-opening reaction of epoxy functional silane with water. The ring-opening reaction is accompanied by hydrolysis and condensation of the alkoxy groups. Such a ring-opening reaction is graphically shown as:

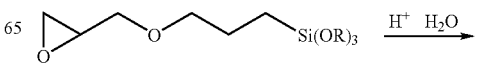

-continued

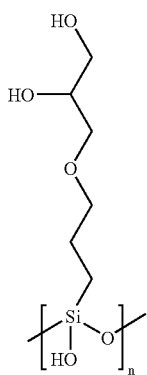

where R is any suitable group. In another example, a commercial source of a diol functional organopolysiloxane, HS2926, can be obtained from DEGUSSA Corp.(Piscataway, N.J.). The HS2926 can be used "as-is" without further purification. Diol functional organopolysiloxanes can be prepared by mixing an epoxy functional silane with an excess of water that is adjusted to a pH of three with acid and refluxed for several hours. The alcohol that forms during the hydrolysis of the alkoxysilane groups can be removed by distillation.

Examples of suitable epoxy functional silanes include, but are not limited to, glycidoxymethyltrimethoxysilane, 3-glycidoxypropyltrihydroxysilane, 3-glycidoxypropyl dimethylhydroxysilane, 3-glycidoxypropyltrimethoxysilane, 3-glycidoxypropyltriethoxysilane,
3-glycidoxypropyldimethoxymethylsilane, 3-glycidoxypropyldimethylmethoxysilane, 3-glycidoxypropyltributoxysilane, 1,3-bis(glycidoxypropyl)tetramethyldisiloxane, 1,3-bis(glycidoxypropyl)tetramethoxydisiloxane,
1,3-bis(glycidoxypropyl)-1,3-dimethyl-1,3-dimethoxydisiloxane,
2,3-epoxypropyltrimethoxysilane, 3,4-epoxybutyltrimethoxysilane, 6,7-epoxyheptyltrimethoxysilane, 9,10-epoxydecyltrimethoxysilane, 1,3-bis(2,3-epoxypropyl) tetramethoxydisiloxane, 1,3-bis(6,7-epoxy-heptyl) tetramethoxydisiloxane, 2-(3,4-epoxycyclohexyl) ethyltrimethoxysilane, and the like.

Any suitable multifunctional crosslinker or combinations of multifunctional crosslinkers can be used in the present invention. The multifunctional crosslinker can be any multifunctional carboxylic acid, multifunctional anhydride, silylated multifunctional anhydride, silylated mutifunctional carboxylic acid, and combinations thereof which are compatible with epoxy functional silanes, diol functional organopolysiloxanes, or other components of the coating compositions. Silylated multifunctional anyhdrides and carboxylic acids have —Si(OR') groups that are capable of interacting with the hydrolysis products and partial condensates of epoxy functional silanes, diol functional organopolysiloxanes, tetrafunctional silanes, disilanes, and alkyl silanes.

The multifunctional crosslinker can include, but is not limited to, multifunctional carboxylic acids as well as anhydrides which produce multifunctional carboxylic acids. The carboxylic acid functional compound can be represented by the formula $R^7(COOR^8)_x$, where x is an integer of 1, 2, 3, or 4, and where $R^7$ is selected from the group consisting of H, an alkyl group, a functionalized alkyl group, an alkylene group, an aryl group, a functionalized aryl group, an alkyl ether, and combinations thereof wherein each of the alkyl group, the alkylene group, the aryl group, the functionalized alkyl group, and the alkyl ether are further characterized as containing from 1 to about 10 carbon atoms, and where $R^8$ is selected from the group consisting of H, a formyl group, a carbonyl group, or an acyl group, where the acyl group can be functionalized with an alkyl group, a functionalized alkyl group, an alkylene group, an aryl group, a functionalized aryl group, an alkyl ether, and combinations thereof wherein each of the alkyl group, the functionalized alkyl group, the alkylene group, the aryl group, the functionalized aryl group, and the alkyl ether are further characterized as containing from 1 to about 10 carbon atoms.

Examples of multifunctional carboxylic acids which can be employed in the preparation of the coating compositions of the present invention include, but are not limited to, malic acid, aconitic acid (cis,trans), itaconic acid, succinic acid, malonic acid, glutaric acid, adipic acid, pimelic acid, suberic acid, azelaic acid, sebacic acid, cyclohexyl succinic acid, 1,3,5 benzene tricarboxylic acid, 1,2,4,5 benzene tetracarboxylic acid, 1,4-cyclohexanedicarboxylic acid, 1,3-cyclohexanedicarboxylic acid, 1,1-cyclohexanediacetic acid, 1,3-cyclohexanedicarboxylic acid, 1,1-cyclohexanediacetic acid, 1,3-cycloheanediacetic acid, 1,3,5-cyclohexanetricarboxylic acid and unsaturated dibasic acids such as fumaric acid and maleic acid and combinations thereof.

Examples of multifunctional anhydrides which can be used in the coating compositions of the present invention include, but are not limited to, the anhydrides of the above mentioned carboxylic acids such as the cyclic anhydrides of the above mentioned dibasic acids such as succinic anhydride, itaconic anhydride, glutaric anhydride, trimellitic anhydride, pyromellitic anhydride, phthalic anhydride, maleic anhydride, and combinations thereof.

The multifunctional crosslinker can also include, but is not limited to, a carboxylic acid or acid anhydride which contains a —Si(OR') group. An example of such a material is 3-triethoxysilylpropylsuccinic anhydride.

Optionally, in addition to the multifunctional crosslinker of the coating composition, a mineral acid such as, for example, hydrochloric acid or nitric acid, can be used as a co-hydrolysis catalyst for the hydrolysis of the silane compounds described herein.

Any suitable tetrafunctional silane or combination of tetrafunctional silanes can be used in the present invention in amounts insufficient to render the coatings rigid. For example, the tetrafunctional silane can have formulas of $Si(OR^9)_4$, where $R^9$ is H, an alkyl group containing from 1 to about 5 carbon atoms and ethers thereof, a —$Si(OR^{10})_3$ group where $R^{10}$ is a H, an alkyl group containing from 1 to about 5 carbon atoms and ethers thereof, or another —Si(OR¹⁰)₃ group and combinations thereof. Examples of tetrafunctional silanes represented by the formula $Si(OR^9)_4$ are tetramethyl orthosilicate, tetraethyl orthosilicate, tetrapropyl orthosilicate, tetraisopropyl orthosilicate, tetrabutyl orthosilicate, tetraisobutyl orthosilicate, tetrakis(methoxyethoxy) silane, tetrakis(methoxypropoxy)silane, tetrakis(ethoxyethoxy)silane, tetrakis(methoxyethoxyethoxy)silane, trimethoxyethoxy-silane, dimethoxydiethoxysilane, triethoxymethoxysilane, poly(dimethoxysiloxane), poly(diethoxysiloxane), poly(dimethoxy-diethoxysiloxane), tetrakis(trimethoxysiloxy)silane, tetrakis(triethoxysiloxy) silane, and the like. In addition to the $R^9$ and $R^{10}$ substituents described above for the tetrafunctional silane, $R^9$ and $R^{10}$ taken with oxygen ($OR^9$) and ($OR^{10}$) can be carboxylate groups. Examples of tetrafunctional silanes with carboxylate functionalities are silicon tetracetate, silicon tetrapropionate and silicon tetrabutyrate.

The compositions can include any suitable disilanes in amounts insufficient to render the coatings rigid. For example, the disilanes can be represented by the formula $(R^{11}O)_xR^{12}_{3-x}Si-R^{13}_y-Si-R^{14}_{3-x}(OR^{15})_x$; where x is 0, 1, 2, or 3 and y is 0 or 1; $R^{12}$ and $R^{14}$ are either H, an alkyl group containing from about 1 to about 10 carbon atoms, a functionalized alkyl group, an alkylene group, an aryl group, an alkypolyether group, and combinations thereof; $R^{11}$ and $R^{15}$ are either H, an alkyl group containing from about 1 to about 10 carbon atoms, an acetyl group, and combinations thereof. If y is 1 then $R^{13}$ can be an alkylene group containing from about 1 to about 12 carbon atoms, an alkylenepolyether containing from about 1 to about 12 carbon atoms, an aryl group, an alkylene substituted aryl group, an alkylene group which may contain one or more olefins, S, or O. If x is 0 then $R^{12}$ and $R^{14}$ are Cl or Br. If y is 0 then there is a direct silicon—silicon bond. Examples of such disilanes include, but are not limited to, bis(triethoxysilyl)ethane, bis(triethoxysilyl)methane; bis(trichlorosilyl)methane, bis(triethoxysilyl)ethylene, 1,3-bis(triethoxysilyl)ethane, hexaethoxydisiloxane, and hexaethoxydisilane. The selection of the disilane, as well as the amount of such a disilane incorporated into the coating compositions, will depend upon the particular properties to be enhanced or imparted to either the coating composition or the cured coating composition.

The compositions can include any other suitable alkyl silanes (i.e, trifunctional silanes, difunctional silanes, monofunctional silanes, and mixtures thereof, hereinafter referred to as silane additives) in amounts insufficient to render the coatings rigid. The alkyl silane additives which can be incorporated into the coating compositions of the present invention can have the formula $R^{16}_xSi(OR^{17})_{4-x}$ where x is a number of 1, 2 or 3; $R^{16}$ is H, or an alkyl group containing from 1 to about 10 carbon atoms, a functionalized alkyl group, an alkylene group, an aryl group an alkoxypolyether group, and combinations thereof; $R^{17}$ is H, an alkyl group containing from 1 to about 10 carbon atoms, an acetyl group, and combinations thereof. Examples of silane additives represented by the above-defined formula are methyltrimethoxysilane, ethyltrimethoxysilane, propyltrimethoxysilane, butyltrimethoxysilane, isobutyltrimethoxysilane, hexyltrimethoxysilane, octyltrimethoxysilane, decyltrimethoxysilane, cyclohexyltrimethoxysilane, cyclohexylmethyltrimethoxysilane, 3-methacryloxypropyltrimethoxysilane, vinyltrimethoxysilane, allyltrimethoxysilane, dimethyldimethoxy-silane, 2-(3-cyclohexenyl)ethyltrimethoxysilane, 3-cyanopropyl-trimethoxysilane, 3-chloropropyltrimethoxysilane, 2-chloroethyltrimethoxysilane, phenethyltrimethoxysilane, 3-mercaptopropyltrimethoxysilane, 3-aminopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl)phenethyltrimethoxysilane, chloromethyltriethoxysilane, 2-chloro-ethyltriethoxysilane, 3-chloropropyltriethoxysilane, phenyltriethoxysilane, ethyltriethoxysilane, propyltriethoxysilane, butyltriethoxysilane, isobutyltriethoxysilane, hexyltriethoxysilane, octyltriethoxysilane, decyltriethoxysilane, cyclohexyl-triethoxysilane, cyclohexylmethyltriethoxysilane, 3-methacryloxypropyltriethoxysilane, vinyltriethoxysilane, allyltriethoxysilane, [2-(3-cyclohexenyl)ethyltriethoxysilane, 3-cyanopropyltriethoxysilane, 3-methacrylamidopropyltriethoxysilane, 3-methoxypropyltrimethoxysilane, 3-ethoxypropyltrimethoxysilane, 3-propoxypropyltrimethoxysilane, 3-methoxyethyltrimethoxysilane, 3-ethoxyethyltrimethoxysilane, 3-propoxyethyltrimethoxysilane. The selection of the silane additive, as well as the amount of such silane additive incorporated into the coating compositions, will depend upon the particular properties to be enhanced or imparted to either the coating composition or the cured coating composition.

In certain applications, it can be useful to add colloidal silica to the coating composition in amounts insufficient to render the cured coating rigid. Colloidal silica is commercially available under a number of different tradename designations, including Nalco (Nalco Chemical Co., Naperville, Ill.); Nyacol (Nyacol Products, Inc., Ashland, Mass.); Snowtex (Nissan Chemical Industries, LTD., Tokyo, Japan); Ludox (DuPont Company, Wilmington, Del.); and Highlink O G (Clariant, Charlotte, N.C.). The colloidal silica is an aqueous or organic solvent dispersion of particulate silica and the various products differ principally by particle size, silica concentration, pH, presence of stabilizing ions, solvent makeup, and the like. It is understood by those skilled in the art that substantially different product properties can be obtained through the selection of different colloidal silicas.

Colloidal silica, when added to a coating composition, is considered a reactive material. The surface of the silica is covered with silicon bound hydroxyls, some of which are deprotonated, which can interact with materials in the coating composition. The extent of these interactions is dictated by a variety of factors, including solvent system, pH, concentration, and ionic strength. The manufacturing process further affects these interactions. Those skilled in the art recognize that colloidal silica can be added into a coating formulation in different ways with different results. The colloidal silica can be added to the coating composition at any suitable time.

The addition of colloidal silica to the coating compositions of the present invention can further enhance the abrasion resistance of the cured coating compositions and can further contribute to the overall stability of the coating compositions. In the same manner, other metal oxides may be added to the coating compositions of the present invention. Such additions may be made instead of, or in addition to, any colloidal silica additions. Metal oxides may be added to the inventive coatings to provide or enhance specific properties of the cured coating, such as abrasion resistance, refractive index, anti-static, anti-reflectance, weatherability, etc. Those skilled in the art recognize that the same types of reasons for including the colloidal silica in the compositions of the present invention also apply more generally to including metal oxides. Examples of metal oxides that may be used in the coating compositions of the present invention include silica, zirconia, titania, ceria, tin oxide, and combinations thereof.

The amount of colloidal silica incorporated into the coating compositions of the present invention can vary widely and will generally depend on the desired properties of the cured coating produced from the coating compositions, as well as the desired stability of the coating compositions. Similarly, the amount of metal oxides incorporated into the coating compositions of the present invention can vary widely and will generally depend on the desired properties of the cured coating produced from the coating compositions, as well as the desired stability of the coating compositions. The colloidal silica and/or metal oxides will generally have a particle size in the range of 2 to 150 millimicrons in diameter, and more desirably, a particle size in the range of from about 2 to 50 millimicrons.

Although a catalyst is not an essential ingredient of the present invention, the addition of a catalyst can affect abrasion resistance and other properties of the coating, including stability, porosity, cosmetics, caustic resistance, water resistance, etc. The amount of catalyst used can vary widely, but when present will generally be in an amount sufficient to provide from about 0.1 to about 10 weight percent, based on the total solids of the coating composition.

Examples of catalysts that can be incorporated into the coating compositions of the present invention include, but are not limited to, (i) metal acetylacetonates, (ii) diamides, (iii) imidazoles, (iv) amines and ammonium salts, (v) organic sulfonic acids and their amine salts, (vi) alkali metal salts of carboxylic acids, (vii) alkali metal hydroxides and (viii) fluoride salts. Thus, examples of such catalysts include for group (i) such compounds as aluminum, zinc, iron and cobalt acetylacetonates; for group (ii) dicyandiamide; for group (iii) such compounds as 2-methylimidazole, 2-ethyl-4-methylimidazole and 1-cyanoethyl-2-propylimidazole; for group (iv) such compounds as benzyldimethylamine, and 1,2-diaminocyclohexane; for group (v) such compounds as trifluoromethanesulfonic acid; for group (vi) such compounds as sodium acetate; for group (vii) such compounds as sodium hydroxide, and potassium hydroxide; and for group (viii) such compounds as tetra n-butyl ammonium fluoride, and the like.

An effective amount of a leveling or flow control agent can be incorporated into the composition to spread more evenly or level the composition on the surface of the substrate and to provide substantially uniform contact with the substrate. The amount of the leveling or flow control agent can vary widely, but can be an amount sufficient to provide the coating composition with from about 10 to about 5,000 ppm of the leveling or flow control agent. Any conventional, commercially available leveling or flow control agent which is compatible with the coating composition and the substrate, which is capable of leveling the coating composition on a substrate, and which enhances wetting between the coating composition and the substrate can be employed. The use of leveling and flow control agents is well known in the art and has been described in the "Handbook of Coating Additives" (ed. Leonard J. Calbo, pub. Marcel Dekker), pg 119–145, the entire contents of which are hereby expressly incorporated herein by reference in their entirety.

Examples of such leveling or flow control agents which can be incorporated into the coating compositions of the present invention include, but are not limited to, organic polyethers such as TRITON X-100, X-405, and N-57 from Rohm and Haas, silicones such as Paint Additive 3, Paint Additive 29, and Paint Additive 57 from Dow Corning, SILWET L-77 and SILWET L-7600 from OSi Specialties, and fluorosurfactants such as FLUORAD FC-4430 from 3M Corporation.

In addition, other additives can be added to the coating compositions of the present invention to enhance the usefulness of the coating compositions or the coatings produced by curing the coating compositions. For example, ultraviolet absorbers, antioxidants, and the like can be incorporated into the coating compositions of the present invention if desired.

In one embodiment, ultraviolet stabilizers can be added to the coating compositions. Any suitable ultraviolet stabilizer and radical scavenger may be used in the present invention at any concentration effective to protect a substrate from the degradative effects of light. The use of these additives is described in the "Handbook of Coating Additives" (ed. Leonard J. Calbo, pub. Marcel Dekker), pg 225–269. In another embodiment, ultraviolet stabalizers can be added to the primer compositions.

In another embodiment, a surfactant or mix of surfactants can be included in the coating compositions to provide the coated article with anti-fogging properties. Including surfactant results in a high wetting tension on the surface of the dried coating, and the high wetting tension prevents the formation of minute droplets, i.e., fog, on the coating surface. The surfactant further enhances the wet-out of the water to maintain a clear, non-fogged surface. An example of a suitable surfactant is Dioctylsulfosuccinate, available as Aerosol OT 75 from Cytec Industries Inc. West Patterson, N.J. The surfactant component can be present at about 0.4 to 15% weight percent of the coating composition. Higher levels can be used; however, they can result in an increase in haze, which can be undesirable for many applications. The anti-fogging effect of coatings can be measured by storing the article with the cured coating on the surface at 20° C., and then subjecting the coated article to saturated water vapor at 60° C. If the coated article becomes clear after 10 seconds and remains clear for at least 1 minute, the coating is anti-fogging.

The coating compositions can be made in any suitable manner. For example, the at least one of the epoxy functional silane and the diol functional organopolysiloxane and the multifunctional crosslinker can be added to a solvent and water and allowed to react at room temperature overnight. Additional additives, such as a leveling agent, may then be added. The coating composition can be applied to a substrate and cured to form a coating.

In accordance with embodiments of the present invention, an article can be provided. The article can comprise a substrate and a coating formed on at least one surface of the substrate by curing coating compositions of the present invention. Any suitable substrate may be coated with the coating compositions of the present invention. For example, plastic materials, wood, metal, printed surfaces, and leather can be coated. The compositions are especially useful as coatings for synthetic organic polymeric substrates in sheet or film form, such as acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, and the like. Transparent polymeric materials coated with these compositions are useful as flat or curved enclosures, such as windows, skylights and windshields, especially for transportation equipment. Plastic lenses, such as acrylic, poly (diethylene glycol-bis-allyl carbonate) (ADC) or polycarbonate lenses, can also be coated with the compositions of the invention.

The coating compositions can be coated on the substrates in any suitable manner. For example, the compositions of the invention can be applied to solid substrates by conventional methods, such as flow coating, spray coating, curtain coating, dip coating, spin coating, roll coating, etc. to form a continuous surface film.

By choice of proper coating composition, application conditions and pretreatment (including the use of primers) of the substrate, the coating compositions of the present invention can be adhered to substantially all solid surfaces. After application of the coating compositions of the present invention to solid substrates, the coatings can be heat cured at any suitable temperature for any suitable period of time. For example, the coatings can be heat cured at temperatures in the range of 50 to 200° C. or more for a period of from seconds to 18 hours or more. It will be understood that the coatings can be cured in any other suitable manner. For example, an ultraviolet activated photoinitiator capable of initiating cationic cure can be added so the coating can be at least partially cured by ultraviolet light. It will be understood that the coatings can be subsequently cured by another process such as a heat cure. Any suitable photoinitiator can be used. For example, aromatic onium salt or iron arene salt complexes available from Ciba Specialty Chemicals Corp., Terrytown, N.Y. can be used.

The coating thickness can be varied by means of the particular application technique, but coatings having a thickness of from about 0.5 to 20 microns or from about 1 to about 10 microns can be used. It will be understood that the coatings can be substantially transparent.

In accordance with one embodiment of the present invention, the coating compositions may be applied to a substrate having a primer disposed thereon. Any suitable primer can be used. For example, a polyurethane dispersion based primer can be used. Examples of such suitable primers are detailed in U.S. Pat. No. 5,316,791, the entire contents of which is incorporated herein expressly by reference. An example of a such a suitable primer is PR1180 available from SDC Technologies, Inc., Anaheim, Calif. In another example, the primer can be modified with ultraviolet light absorbing substances and/or radical scavengers in order to increase the weatherability of the coated substrate. The primer can be applied to a substrate and air or thermally dried, e.g., air-dried for less than about 2 hours, and the coating composition can be subsequently applied and cured, after which the coated substrate may be formed.

In accordance with further embodiments of the present invention, formed articles are provided. The formed articles comprise a formed substrate having a coating in accordance with the present invention on at least one surface. The coating is applied to the formed articles prior to forming the article.

In accordance with additional embodiments of the present invention, tintable, abrasion resistant coating compositions, articles having tintable, abrasion resistant cured coatings, and processes for tinting transparent, tintable, abrasion resistant coatings that are coated on at least one surface of a substrate are provided. The coating compositions can be the coating compositions as described herein. The processes comprise contacting at least one surface of a substrate with a coating composition that forms a transparent, tintable, abrasion-resistant coating upon curing, curing the coating composition on the substrate to form a transparent, tintable, abrasion-resistant coating, and tinting the cured coating by immersing the coated surface of the substrate in a dye bath for a period of time sufficient for the cured coating to absorb or transmit to the substrate a desired amount of the dye.

The coating compositions can be the coating compositions described herein. In some examples, the at least one of the epoxy functional silane and the diol functional organopolysiloxane is present in a molar ratio to the multifunctional crosslinker of between about 10:1 to about 1:10. In one example, the at least one of the epoxy functional silane and the diol functional organopolysiloxane can be present in a molar ratio to the multifunctional crosslinker of about 6:1 to about 1:6. In other examples, the at least one of the epoxy functional silane and the diol functional organopolysiloxane can be present in a molar ratio to the multifunctional crosslinker of about 3:1 to about 1:3.

In another example, the at least one of the epoxy functional silane and the diol functional silane comprises about 11 to about 83 percent by weight of the solids of the composition, and the multifunctional crosslinker comprises about 17 to about 89 percent by weight of the solids of the composition. In another example, the at least one of the epoxy functional silane and the diol functional silane comprises about 20 to about 70 percent by weight of the solids of the composition, and the multifunctional crosslinker comprises about 30 to about 80 percent by weight of the solids of the composition. In a further example, the solvent constituent of the aqueous-organic solvent mixture comprises from about 40 to about 98 percent by weight of the composition. In yet another example, the solvent constituent of the aqueous-organic solvent mixture comprises from about 50 to about 95 percent by weight of the composition.

In another embodiment of the present invention, the coating composition may include tetrafunctional silanes, disilanes, or other alkyl silanes that are not epoxy functional in any suitable amounts. It will be understood that for certain applications, the tetrafunctional silanes, disilanes, or other alkyl silanes may be present in amounts that render the coating rigid or somewhat rigid. Suitable tetrafunctional silanes, disilanes, or other alkyl silanes include those described herein. In further embodiments, the compositions can include any other suitable alkyl silanes (i.e, trifunctional silanes, difunctional silanes, mono functional silanes, and mixtures thereof, hereinafter referred to as silane additives) in any suitable amounts. Similarly, it is understood that for certain applications, the tetrafunctional silanes, disilanes, or other alkyl silanes may be present in amounts that render the coating rigid or somewhat rigid. Suitable alkyl silanes include those described herein. In certain applications, it can be useful to add colloidal silica to the coating composition in suitable amounts. It will be understood that for certain applications, the colloidal silica may be present in amounts that render the coating rigid or somewhat rigid, and suitable colloidal silicas and uses include those described herein.

It will be understood that the coating compositions can be applied in any suitable manner. For example, the coating compositions can be applied to suitable substrates by conventional methods, such as flow coating, spray coating, curtain coating, dip coating, spin coating, roll coating, etc. to form a continuous surface film. The cured coating can have any suitable thickness. For example, the cured coating can have a thickness of between about 0.2 µm to about 20 µm, about 1.5 µm to about 10 µm, or about 2.5 µm to about 7 µm. One having skill in the art would recognize that the thickness and/or solids content of the coating composition can be adjusted to provide a coating having a suitable thickness and/or desired abrasion resistance.

Any suitable substrate may be coated with the coating compositions, and the coating compositions can be cured on a substrate to form an article having a cured coating, wherein the cured coating and/or the substrate are tintable and the cured coating exhibits good abrasion resistance. For example, plastic materials, wood, metal, printed surfaces, and leather can be coated. The compositions are especially useful as coatings for synthetic organic polymeric substrates in sheet or film form, such as acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, and the like. Transparent polymeric materials coated with these compositions are useful as flat or curved enclosures, such as windows, skylights and windshields, especially for transportation equipment. Plastic lenses, such as acrylic, poly (diethylene glycol-bis-allyl carbonate) (ADC), polycarbonate lenses, or polyamide, including Nylon, can also be coated with the compositions of the invention. Polyamide useful for optical applications is available as a granulate from EMS-Chemie Inc. under the Grilamid® trade name or from Degussa Corp. under the Trogamid® trade name. For example, the coating compositions can be coated on ophthalmic lenses, such as prescription and non-prescription reading glasses, sunglasses, and safety lenses. Ophthalmic lenses are made from a wide variety of raw materials they are generally distinguished by the refractive index and classified into low-, mid- and high-index materials. An example for a low-index material is CR 39® the PPG Industries registered trade name for ADC, a mid index material is as well available from PPG industries under the Trivex® trade name. High Index raw materials are available from Mitsui Chemicals Inc. Japan under their MR® series trade name. These raw materials are cast by lens manufacturers into lenses and available under their specific trade names.

The step of tinting can be carried out in any suitable manner. For example, the surface of a substrate coated with a cured coating of the present invention can be immersed in a heated dye bath containing a suitable colored dye, e.g., BPI Sun Gray or BPI Black, both of which are dyes sold by Brain Power Incorporated of Miami, Fla. The dye solution is prepared by diluting about one part of the BPI dye concentration to about ten parts water, and then heating the resulting solution to a temperature in the range of about 88° C. to about 100° C., while constantly stirring the solution. The coated surface of the substrate can be cleaned by wiping with a compatible solvent prior to immersion in the dye bath for a period of time sufficient to absorb or transmit the desired amount of dye, then washed with distilled water to remove the excess dye and blotted dry. It will be understood by those having skill in the art that the intensity of the tint can be adjusted by varying the thickness of the coating or the time immersed in the dye bath. The degree of tint obtained can be determined by using a calorimeter, such as a Gardner XL-835, which measures the percent of light transmittance.

It is believed that a high amount of dye can be absorbed by the cured coating or transmitted to the substrate within a reasonable length of time. For example, in the ophthalmic industry two levels of light transmittance ("LT") are generally used in connection with the application of tints to lenses for eyeglasses. A 50 percent light transmittance means that the amount of dye absorbed or transmitted is sufficient to allow only 50 percent of the light to pass through the tinted lens. This is generally the level of light transmittance applicable to "fashion" tints for eyeglasses. A darker tint such as that used for sunglasses generally has about 20 percent light transmittance which means that the amount of dye absorbed or transmitted allows only 20 percent of the light to pass through the lens. In some examples, Nylon and ADC coated lenses can be tinted to less than about a 10 percent to about a 20 percent light transmittance in about 15 to about 30 minutes.

In some examples, the tinted lenses produced according to these processes and/or using these coating compositions exhibit improved environmental durability or weatherability. For example, the tinted lenses can exhibit resistance to adhesion failure and crack as tested by QUV method A or method B accelerated weathering testing after about 72 or about 120 hours. The QUV method A test is performed according to the following procedure. For QUV method A, the accelerated weathering testing, an AR Council procedure of UTP#: DUR-5.2.10, uniform test procedure for the environmental durability test part A: QUV system, is followed. A QUV accelerated weathering tester, available from the Q panel corporation, 800 Canterbury Road, Cleveland, Ohio, is used. The QUV unit is set for repeating cycles of 4 hours UV-A light exposure and 4 hours of condensation with a panel temperature of 55° C., the irradiance of the QUV is set for 0.8 $W/m^2/nm$ and calibrated by a radiometer using the procedures outlined in the respective operating manuals. Lenses for QUV testing are prepared according to the following procedures. Select an area on a lens without coating defects. Use a cutting device make six parallel cuts 1.5 mm±0.5 mm apart and approximately 15 to 20 mm in length on the front surface (convex) of the lens to be exposed. Rotate the lens and make six parallel cuts 1.5 mm±0.5 mm apart 90 degrees from the first set.

The test lenses are mounted in the lens holder with the test surfaces facing the UVA lamps. After 16 hours of exposure, the unit is paused. The lenses are removed from the QUV, and examined on the exposed surface according to UTP#: APP-5.3.1-Standard Inspection Method for Determining Material and Surface Quality. Adhesion of the coatings is evaluated by the crosshatch testing according to the following procedures. Apply a tape over the crosshatched pattern allowing one end of the tape to extend pass the end of the lens by at least ½ inch. Rub back and forth several times on the surface of the tape over the crosshatched area to insure good contact of the tape to the surface. Wait 90 seconds±30 seconds after applying the tape. While holding the lens firmly, grasp the extended end of the tape with your hand and pull rapidly to the opposite side of the lens as close to a 180 degrees as possible. Repeat the crosshatch testing two more times for a total of three tape pulls. Examine the crosshatched area according to UTP#: APP-5.3.1-Standard Inspection Method for Determining Material and Surface Quality. The test lenses are then returned to the QUV tester. The lens holder shall be placed in different locations on the rack as compared to the initial position to account for tube-to-tube variability. The testing steps are repeated daily for a total of 10 days. Coatings with good weatherability possess no defects after longer QUV exposure.

The QUV method B test is performed according to the following procedure. For QUV method B accelerated weathering testing, the procedure of ASTM G 53-88, standard practice for operating light and water exposure apparatus (fluorescent UV-condensation type) for exposure of nonmetallic materials, is followed. A QUV accelerated weathering tester, available from the Q panel corporation, 800 Canterbury Road, Cleveland, Ohio, is used. The test procedure consists of 4 hours of exposure to UV-B light (at 48° C.) followed by 4 hours condensation of water vapor (at 50° C.). The cycle is continuously repeated for 120 hours. The irradiance of the QUV is set for 0.8 $W/m^2/nm$ and calibrated by a radiometer using the procedures outlined in the respective operating manuals.

Lenses for the QUV testing are prepared according to the following procedures. Clean the lens with alcohol using a Kleenex soft cloth. Wipe it dry and observe its surfaces with the light projector to ensure it does not already have any damage. Use a cutting device make six parallel cuts 1.5 mm±0.5 mm apart and approximately 15 to 20 mm in length on the front surface (convex) of the lens to be exposed. Rotate the lens and make six parallel cuts 1.5 mm±0.5 mm apart 90 degrees from the first set. In case of a standard lens (base curve $\leqq 4.50$), the cross-hatch is made in the middle of the two half of the lens surface. In case of base curve $\geqq 4.50$ a third cross-hatch is required in the middle of the exposed surface. Load the lenses in the QUV lens-holder in a way that the cross-hatched surface is turned inside the QUV. After 24 hours of exposure, the unit is paused. The lenses are removed from the QUV, and examined on the exposed surface.

Adhesion of the coatings is evaluated by the cross-hatch testing according to the following procedures. Cut a strip of tape of about 120–130 mm length and stick it firmly on the lens surface covering both the 2 cross-hatched area. Make sure to avoid any air-bubble between lens surface and tape. Wait minimum 15–20 seconds and then pull out the tape in order to have an angle of 90° between the tape and the lens surface. Repeat the cross-hatch testing two more times for a total of three tape pulls. Examine the crosshatched area according to the UTP#: APP-5.3.1-Standard Inspection Method for Determining Material and Surface Quality. The test lenses are then returned to the QUV tester. The lens holder shall be placed in different locations on the rack as compared to the initial position to account for tube-to-tube variability. Coatings with good weatherability possess no defects after longer QUV exposure.

In some examples, the tinted and/or untinted substrates produced according to these processes exhibit good abrasion resistance. In some examples, the tinted or untinted substrates comprise lenses. For example, the tinted or untinted substrates can exhibit a Bayer number of from above about 1.5 to above about 2 as tested according to the Bayer procedure. One having skill in the art would recognize that Bayer abrasion resistance depends on several factors including coating thickness, substrate material, and coating conditions. For testing abrasion resistance of coated substrates according to the Bayer procedure, a commercially available alundum (grain code 1524, 12 grit, alundum ZF) sold by Saint-Gobain Ceramic Materials of Canada, Inc., Niagara Falls, Ontario, is used as the abrasive material. In this test, 540 grams alumdum is loaded into a 9 5/16"×6 3/4" cradle fitted with four lenses. Each set of four lenses, typically two poly(diethylene glycol-bis-allyl carbonate) lenses, herein referred to as ADC lenses, and two coated lenses, are subjected to a 4 inch stroke (the direction of the stroke coinciding with the 9 5/16" length of the cradle) at an oscillation frequency of 300 strokes per minute for a total of 4 minutes. The lens cradle is repositioned by turning 180 degrees after the initial 2 minutes of oscillations. Repositioning of the cradle is used to reduce the impact of any inconsistencies in the oscillating mechanism. The ADC reference lenses used are Silor 70 mm plano FSV lenses, purchased through Essilor of America, Inc. of St. Petersburg, Fla.

The above described procedure is slightly modified from that which is described by the AR Council of America by increasing the weight of the alundum to accommodate the increased surface area of the larger cradle. The cradle described above holds 4 lenses. The haze generated on the lenses is then measured on a BYK Gardner Haze-gard Plus hazemeter. The haze gain for each lens was determined as the difference between the initial haze on the lenses and the haze after testing. The ratio of the haze gain on the ADC reference lenses to the haze gain on the coated sample lenses was then reported as the resultant abrasion resistance of the coating material. A ratio of greater than 1 indicates a coating which provides greater abrasion resistance than the uncoated ADC reference lenses. The ratio is commonly referred to as the Bayer number. Coatings with higher abrasion resistance possess larger Bayer numbers than coatings with lower abrasion resistance.

In other examples, the tinted or untinted substrates can exhibit abrasion resistance rated as good or better as demonstrated by the steel wool test. Steel wool abrasion resistance is evaluated according to the following procedure. Steel Wool abrasion resistance is evaluated by the YT-520, a commercially available instrument made by Yin Tsung Co. Ltd, Taiwan. The test is intended for the qualitative determination of abrasion/scratch resistance of uncoated and coated lens upon rubbing with standardized grades of steel wool. The coated lens is cleaned with water or alcohol to remove surface contamination and dried thoroughly. The lens is placed on the sample holder and secured by tuning the screw to the left hand side. 0000 grade of steel wool is selected and a small pad of the steel wool, approximately 2×2 inches, is prepared as the abrasive media. The steel wool is loaded into the steel wool holder. 1000 grams of stainless steel weights are placed on the weight holder. After 10 cycles of testing, the sample lens is removed from the sample holder, cleaned again using water or alcohol, and rated according to the following criteria: excellent—no visible scratch; good—light visible scratch; fair—moderate scratch; and poor—severe scratch.

In some examples, the processes can further include applying a primer to the substrate prior to contacting at least one surface of the substrate with the coating composition. In some examples, the articles can comprise substrates having a primer disposed thereon and a cured coating disposed on at least a portion of the primer. The primer can be at least one of the polyurethane dispersion based primer as described herein. The primer can be applied to a substrate and air or thermally dried, e.g., air-dried for less than about 2 hours, and the coating composition can be subsequently applied and cured. In other examples, the polyurethane dispersion based primers can further include a suitable crosslinking agent to promote the adhesion of the coating to the substrate. For example, the crosslinking agent can comprise a blocked isocyanate and/or aziridine, epoxy, and melamine resins.

The aziridine, epoxy, and melamine resins can react very slowly at room temperature with the polyurethane dispersion of the polyurethane dispersion based primer. The resins may need to be used as a two part system or have to be used within a short time from manufacture. Examples of such resins include, but are not limited to, the aziridine resin Neoresin CX100, the melamine resins Cytec Cymel 303 and Cytec Cymel 385, and the epoxy resins GE Silicones A-186 and CIBA Araldite ECN 1400. In other examples, the crosslinking agent can comprise the blocked isocyanate Baxenden BI 7986, and this blocked isocyanate may be dispersed in water for use in the polyurethane dispersion of the polyurethane dispersion based primer.

The crosslinking agent can be provided in any suitable amount. For example, the crosslinking agent can comprise about 1 percent to about 30 percent, about 1 percent to about 20 percent, or about 5 percent to about 15 percent of the primer composition by weight of the solids of the primer composition. It is believed that the addition of the crosslinking agent to the primer can improve the adhesion of the cured coating to the substrate and the environmental durability or weatherability of the cured coating. In further examples, the polyurethane dispersion based primer can further include an ultraviolet light absorber (UVA), as described herein. The ultraviolet light absorber (UVA) can be provided in any amount. For example, the UVA can comprise about 0.5 percent to about 40 percent, about 1 percent to about 20 percent, or about 5 percent to about 15 percent of the primer composition by weight of solids.

In accordance with other embodiments of the present invention, compositions are provided which, when applied to a substrate and cured, provides a transparent, tintable coating on the substrate. Additionally, articles and processes involving the coatings are provided. The compositions are as described herein with the addition of at least one suitable blocked isocyanate. In particular, the compositions are as described herein with reference to the tintable coatings. It is believed that suitable blocked isocyanates can result in improved the environmental durability or weatherability of the coating. Examples of suitable blocked isocyanates include, but are not limited to Desmodur Bl 3175, Desmodur Bl 3272, Desmodur Bl 3370, Desmodur Bl 3475 and Desmodur Bl 4265 available from Bayer and Trixene BI 7982, Trixene 7983, Trixene BI 7984, Trixene BI 7980, Trixene BI 7960, Trixene BI 7950 available from Baxenden LLC. The blocked isocyanates can be provided in any suitable amount. For example, the blocked isocyanates can comprise about 1 percent by weight to about 30 percent by weight of the solids of the coating composition. In other examples, the blocked isocyanates can comprise from about 2 percent to about 15 percent by weight of the solids of the coating composition or about 2 percent to about 10 percent by weight of the solids of the coating composition.

The coating composition having blocked isocyanates can be applied to any suitable substrate, to form a cured coating of any suitable thickness, in any suitable manner. For example, plastic materials, wood, metal, printed surfaces, and leather can be coated. The compositions are especially useful as coatings for synthetic organic polymeric substrates in sheet or film form, such as acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, and the like. Transparent polymeric materials coated with these compositions are useful as flat or curved enclosures, such as windows, skylights and windshields, especially for transportation equipment. Plastic lenses, such as acrylic, poly(diethylene glycol-bis-allyl carbonate) (ADC), polycarbonate lenses, or polyamide, including Nylon, can also be coated with the compositions of the invention. Polyamide useful for optical applications is available as a granulate from EMS-Chemie Inc. under the Grilamid® trade name or from Degussa Corp. under the Trogamid® trade name. For example, the coating compositions can be coated on ophthalmic lenses, such as prescription and non-prescription reading glasses, sunglasses, and safety lenses. Ophthalmic lenses are made from a wide variety of raw materials they are generally distinguished by the refractive index and classified into low-, mid- and high-index materials. An example for a low-index material is CR 39® the PPG Industries registered trade name for ADC, a mid index material is as well available from PPG industries under the Trivex® trade name. High Index raw materials are available from Mitsui Chemicals Inc. Japan under their MR® series trade name. These raw materials are cast by lens manufacturers into lenses and available under their specific trade names. The coating can be applied by any suitable methods as discussed herein.

In other examples, the coating composition having blocked isocyanates can be applied to a substrate such that the cured coating can have a thickness of between about 0.2 µm to about 20 µm, about 1.5 µm to about 10 µm, or about 2.5 µm to about 7 µm. One having skill in the art would recognize that the solids content and/or coating thickness of the coating composition can be adjusted to provide a coating having a suitable coating thickness and/or desired abrasion resistance. In some examples, the cured coating can have a Bayer number of greater than about 1.5 or greater than about 2 as measured according to the Bayer test procedure discussed above. In other examples, the cured coating can have good abrasion resistance as determined by the steel wool test.

In some examples, the cured coating formed from the coating composition having blocked isocyanates can exhibit resistance to adhesion failure and crack as tested by QUV method A or method B after about 72 hours or after about 120 hours. The cured coatings and/or substrates having a cured coating formed from the coating compositions having blocked isocyanates can be applied and tinted according to the processes described herein. In some examples, a primer can be applied to a substrate prior to the application of the coating composition having the blocked isocyanate, as discussed herein. The primer can be the primers discussed herein.

EXAMPLES

The following examples are for purposes of illustration only and are not intended to limit the scope of the claims which are appended hereto. All references cited herein are specifically incorporated by reference.

Example 1

Preparation of a Diol Functional Organopolysiloxane 1000 g of 3-glycidoxypropyltrimethoxysilane epoxy functional silane (A-187, Witco Corporation, Greenwich, Conn.) was added to a 5 liter glass flask fitted with a distillation apparatus. A mixture of 40 g HCl (0.05 N) and 2960 g of deionized water were then added to the 5 liter flask. The solution was then heated to reflux. After 3 hours of reflux, 743 g of solvent was removed by distillation. The product was used "as-is" without further purification.

Example 2

Coating Composition and Primer 7.5 grams of deionized (DI) water were added dropwise to a stirring solution of 15.0 grams of A-187, 19.3 grams of dihydro-3-(3-(triethoxysilyl)propyl)-2,5-furandione silylated multifunctional anyhdride (GF20, Wacker chemical corporation, Adrian, Mich.), and 140.0 grams of isopropanol solvent. The mixture was stirred at room temperature overnight. 0.18 grams of a solution of leveling agent PA-57 (Dow Corning corporation, Midland, Mich.), 10 weight percent propylene glycol monomethyl ether (PM ether, Ashland Chemical, Columbus, Ohio) were added. The composition was left to stir for an additional 20 minutes after the addition of the PA-57 to insure mixing.

This coating composition was applied by flow coating to a PR-1180 (SDC Technologies, Inc., Anaheim, Calif.) primed ¼" thick polycarbonate plaque. After air-drying for 30 minutes, the coating was cured for 2 hours at 130° C. The haze gain results from a Taber test using CS-10F wheels in accordance with the procedure outlined herein were: 1.7% haze at 50 revolutions and 7.5% haze after 200 revolutions. The thickness of the topcoat was 3.5 microns. The formability of the coating was evaluated as described herein on a cylindrical mandrel and no crack was observed at 5" radius.

Example 3

Coating Composition and Primer 8.0 grams of DI water were added dropwise to a stirring solution of 17.7 grams of A-187, 15.2 grams of GF20, and 140.0 grams of isopropanol. The mixture was stirred at room temperature overnight. 0.18 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 2.3% haze at 50 revolutions and 11.4% haze after 200 revolutions. Thickness of the topcoat was 3.5 microns. Formability of the coating was evaluated on a cylindrical mandrel and no crack was observed at 4" radius.

Example 4

Coating Composition and Primer 17.0 grams of DI water were added dropwise to a stirring solution of 45.0 grams of A-187, 29.0 grams of GF20, and 280.0 grams of isopropanol. The mixture was stirred at room temperature overnight. 0.37 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 3.1% haze at 50 revolutions and 17.2% haze after 200 revolutions. Thickness of the topcoat was 3.2 microns. Formability of the coating was evaluated on a cylindrical mandrel and no crack was observed at 3" radius.

Example 5

Coating Composition and Primer 16.0 grams of DI water were added dropwise to a stirring solution of 47.0 grams of A-187, 20.0 grams of GF20, and 280.0 grams of isopropanol. The mixture was stirred at room temperature overnight. 0.36 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 5.3% haze at 50 revolutions and 38.1% haze after 200 revolutions. Thickness of the topcoat was 3.1 microns. Formability of the coating was evaluated on a cylindrical mandrel and no crack was observed at 3" radius.

Example 6

Coating Composition and Primer 15.0 grams of DI water were added dropwise to a stirring solution of 47.0 grams of A-187, 15.0 grams of GF20, and 260.0 grams of isopropanol. The mixture was stirred at room temperature overnight. 0.34 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 6.0% haze at 50 revolutions and 59.1% haze after 200 revolutions. Thickness of the topcoat was 3.2 microns. Formability of the coating was evaluated on a cylindrical mandrel and no crack was observed at 3" radius.

Example 7

Coating Composition and Primer 14.3 grams of DI water were added dropwise to a stirring solution of 30.0 grams of A-187, 38.6 grams of GF20, and 300.0 grams of PM glycol ether (PMOH) solvent. The mixture was stirred at room temperature for three days. 0.38 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 3.0% haze at 50 revolutions and 14.0% haze after 200 revolutions. Thickness of the topcoat was 3.0 microns. Formability of the coating was evaluated on a cylindrical mandrel and no crack was observed at 3" radius.

Example 8

Coating Composition and Primer 16.2 grams of DI water were added dropwise to a stirring solution of 45.0 grams of A-187, 29.0 grams of GF20, and 300.0 grams of PM glycol ether (PMOH). The mixture was stirred at room temperature for three days. 0.39 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 4.7% haze at 50 revolutions and 26.7% haze after 200 revolutions. Thickness of the topcoat was 3.0 microns. Formability of the coating was evaluated on a cylindrical mandrel and no crack was observed at 3" radius.

Example 9

Coating Composition and Primer 15.8 grams of DI water were added dropwise to a stirring solution of 47.2 grams of A-187, 20.3 grams of GF20, and 300.0 grams of PM glycol ether (PMOH). The mixture was stirred at room temperature for three days. 0.38 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 5.8% haze at 50 revolutions and 34.5% haze after 200 revolutions. Thickness of the topcoat was 3.0 microns. Formability of the coating was evaluated on a cylindrical mandrel and no crack was observed at 3" radius.

Example 10

Coating Composition and Primer 15.0 grams of DI water were added dropwise to a stirring solution of 47.2 grams of A-187, 15.2 grams of GF20, and 265.0 grams of PM glycol ether (PMOH). The mixture was stirred at room temperature for three days. 0.34 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 6.4% haze at 50 revolutions and 57.2% haze after 200 revolutions. Thickness of the topcoat was 3.0 microns. Formability of the coating was evaluated on a cylindrical mandrel and no crack was observed at 3" radius.

Example 11

Coating Composition and Primer 2.7 grams of DI water were added dropwise to a stirring solution of 3.8 grams of A-187, 9.7 grams of GF20, and 55 grams of isopropanol/PM glycol ether (1:1). The mixture was stirred at room temperature for three days. 0.08 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.6% haze at 50 revolutions and 5.6% haze after 200 revolutions. Thickness of the topcoat was 3.2 microns. Formability of the coating was evaluated on a cylindrical mandrel and no crack was observed at 6" radius.

Example 12

Coating Composition and Primer 4.0 grams of DI water were added dropwise to a stirring suspension of 15.0 grams of A-187, 1.8 grams of itaconic acid crosslinker, and 75.0 grams of isopropanol. The mixture was stirred at room temperature overnight. 0.10 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 13.3% haze at 50 revolutions and 67.2% haze after 200 revolutions. Formability of the coating was evaluated on a cylindrical mandrel and no crack was observed at 3" radius.

Example 13

Coating Composition and Primer 4.0 grams of DI water were added dropwise to a stirring suspension of 15.0 grams of A-187, 1.4 grams of succinic anhydride crosslinker, and 70.0 grams of isopropanol. The mixture was stirred at room temperature overnight. 0.10 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 36.2% haze at 50 revolutions. Formability of the coating was evaluated on a cylindrical mandrel and no crack was observed at 3" radius.

Example 14

Coating Composition and Primer 4.0 grams of DI water were added dropwise to a stirring suspension of 15.0 grams of A-187, 1.4 grams of succinic anhydride, and 70.0 grams of PM glycol ether (PMOH). The mixture was stirred at room temperature for three days. 0.10 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 42.0% haze at 50 revolutions. Formability of the coating was evaluated on a cylindrical mandrel and no crack was observed at 3" radius.

Example 15

Coating Composition and Primer

A mixture of 15.0 grams of trimethoxy(3-oxiranyl-methoxy)propylsilane hydrolyzed aqueous solution available as HS2926 (, SIVENTO Inc, Piscataway, N.J.), 9.66 grams of GF20, and 70.0 grams of isopropanol was stirred at room temperature overnight. 0.10 grams of a solution of PA-57, 10 weight percent in PM glycol ether, were added. The composition was left to stir for an additional 20 minutes after the addition of the PA-57 to insure mixing. This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.0% haze at 50 revolutions and 3.0% haze after 200 revolutions. Thickness of the topcoat was 3.0 microns. Formability of the coating was evaluated on a cylindrical mandrel and no crack was observed at 7" radius.

Example 16

Coating Composition and Primer

A mixture of 15.0 grams of HS2926, 9.66 grams of GF20, and 70.0 grams of PM glycol ether was stirred at room temperature overnight. 0.10 grams of a solution of PA-57, 10 weight percent in PM glycol ether, were added. The composition was left to stir for an additional 20 minutes after the addition of the PA-57 to insure mixing. This composition was aged at room temperature for 5 days before a coating application. The coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.34% haze at 50 revolutions and 4.19% haze after 200 revolutions. Thickness of the topcoat was 3.0 microns. Formability of the coating was evaluated on a cylindrical mandrel and no crack was observed at 7" radius.

Example 17

Coating Composition and Primer

A mixture of 15.0 grams of HS2926, 0.7 grams of succinic anhydride, and 30.0 grams of isopropanol was stirred at room temperature overnight. 0.05 grams of a solution of PA-57, 10 weight percent in PMOH, were added. The composition was left to stir for an additional 20 minutes after the addition of the PA-57 to insure mixing. This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 26.0% haze at 25 revolutions. Formability of the coating was evaluated on a cylindrical mandrel and no crack was observed at 3" radius.

Example 18

Comparative Example Coating Composition and Primer

A commercially available SDC MP 1154D (SDC Technologies, Inc., Anaheim, Calif.), a representative of coatings described in U.S. Pat. No. 6,001,163, was applied by flow coating to a PR-1180 primed ¼" thick polycarbonate plaque. After air-drying for 30 minutes, the coating was cured for 2 hours at 130° C. Haze gain results from a Taber test using CS-10F wheels were: 0.39% haze at 50 revolutions and 0.78% haze after 200 revolutions. Thickness of the topcoat was 3.0 microns. The coated sample was placed in an oven in accordance with the thermoforming procedure outlined herein. At 165° C., the coating cracked before it could be placed on a cylindrical mandrel.

Example 19

Comparative Example Coating Composition and Primer

A commercially available SDC MP 1193A1 (SDC Technologies, Inc., Anaheim, Calif.), a representative of coatings described in U.S. Pat. No. 6,348,269, was applied by flow coating to a PR-1180 primed ¼" thick polycarbonate plaque. After air-drying for 30 minutes, the coating was cured for 2 hours at 130° C. Haze gain results from a Taber test using CS-10F wheels were: 0.22% haze at 50 revolutions and 0.47% haze after 200 revolutions. Thickness of the topcoat was 5.0 microns. The coated sample was placed in an oven in accordance with the thermoforming procedure outlined herein. At 165° C., the coating cracked before it could be placed on a cylindrical mandrel.

Example 20

Comparative Example Coating Composition and Primer

A commercially available SDC TC332 (SDC Technologies, Inc., Anaheim, Calif.), a representative of coatings described in U.S. Pat. No. 5,013,608 was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.48% haze at 50 revolutions and 3.57% haze after 200 revolutions. Thickness of the topcoat was 3.5 microns. The coated sample was placed in an oven in accordance with the thermoforming procedure outlined herein. At 165° C., the coating cracked before it could be placed on a cylindrical mandrel.

Example 21

Anti-fog Coating Composition and Primer 1.91 grams of DI water were added dropwise to a stirring solution of 4.0 grams of A-187, 5.15 grams of GF20, and 40 grams of PM glycol ether. The mixture was stirred at room temperature overnight. 0.74 grams of surfactant sodium dioctyl sulfosuccinate in mixture of ethanol and water (OT-75) Van Waters & Rogers Inc., Kirkland, Wash.) (75% solid) was added. The composition was left to stir for two hours at room temperature and then aged at a 100 F warm room for 3 weeks before coating application.

This coating composition was applied by flow coating to a PR-1180 primed ¼" thick polycarbonate plaque. After air-drying for 30 minutes, the coating was cured for 2 hours at 130° C. Coating on the surface was stored at 20° C. and than subjected the coated article to saturated water vapor at 60° C. The coated article became clear after 10 seconds and remained clear for at least one minute. Haze gain results from a Taber test using CS-10F wheels were: 1.6% haze at 50 revolutions and 9.0% haze after 200 revolutions. Thickness of the topcoat was 3.2 microns. Formability of the coating was evaluated on a cylindrical mandrel and no crack was observed at 4" radius.

Example 22

Anti-fog Coating Composition and Primer 2.11 grams of DI water were added dropwise to a stirring solution of 5.88 grams of A-187, 3.79 grams of GF20, and 39.2 grams of PM glycol ether. The mixture was stirred at room temperature overnight. 0.74 grams of OT-75 (75% solid) was added. The composition was left to stir for two hours at room temperature and then aged at a 100° F. for 3 weeks before coating application.

This coating composition was applied by flow coating to a PR-1180 primed ¼" thick polycarbonate plaque. After air-drying for 30 minutes, the coating was cured for 2 hours at 130° C. Coating on the surface was stored at 20° C. and than subjected the coated article to saturated water vapor at 60° C. The coated article became clear after 10 seconds and remained clear for at least one minute. Haze gain results from a Taber test using CS-10F wheels were: 4.8% haze at 50 revolutions and 33% haze after 200 revolutions. Thickness of the topcoat was 3.2 microns. Formability of the coating was evaluated on a cylindrical mandrel and no crack was observed at 4" radius.

Example 23

Comparative Example Anti-fog Coating Composition and Primer

A commercially available SDC AF1140 (SDC Technologies, Inc., Anaheim, Calif.) was applied by flow coating to a PR-1180 primed ¼" thick polycarbonate plaque. After air-drying for 30 minutes, the coating was cured for 2 hours at 130° C. The coating on the surface was stored at 20° C. and than subjected to saturated water vapor at 60° C. The coated article became clear after 10 seconds and remained clear for at least 1 minute. Haze gain results from a Taber test using CS-10F wheels were: 3.20% haze at 50 revolutions and 14.3% haze after 200 revolutions. Thickness of the topcoat was 3.1 microns. Formability of the coating was evaluated on a cylindrical mandrel and crack was observed at less than a 10" radius.

Example 24

Coating and Weatherable Primer

A weatherable primer was prepared by mixing a Poly (oxy-1,2-ethanediyl), .alpha.-[3-[3-(2H-benzotriazo(-2-yl)-5-(1,1-dimethylethyl)-4-hydroxyphenyl)-1-oxopropyl] .omega.-[3-[3 [(2H-benzotriazo-(2-yl)-5-(1,1-dimethylethyl)-4-hydroxyphenyl]-1-oxopropoxy], 30–45% by wt. and Poly(oxy-1,2-ethanediyl),.alpha.-[3-[3-(2H-benzotriazo(-2-yl)-5-(1,1-dimethylethyl)-4-hydroxyphenyl)-1-oxopropyl]-.omega.-hydroxy-, 40–55% by wt. (Tinuvin 1130, Ciba Specialty Chemicals Corporation, Tarrytown, N.Y.) into a commercially available PR1180 primer. Thus, 6.42 grams of Tinuvin1130 was added to 150 grams of PR1180. The resulting composition was left to stir for four hours before coating application.

This composition was applied as a primer by flow coating to a ¼" thick polycarbonate plaque. The primer was air dried for one hour before application of a topcoat of Example 7. The final coating was cured for 2 hours at 130° C. Haze gain results from a Taber test using CS-10F wheels were: 2.0% haze at 50 revolutions and 11% haze after 200 revolutions. Formability of the coating was evaluated on a cylindrical mandrel and no crack was observed at 3" radius.

The weatherability of the coating was evaluated by both QUV and Weather-O-Meter. The coating doesn't show adhesion failure and crack after 200 hours exposure to ultraviolet light in both accelerated weathering testers. The QUV was operated under the condition of 8 hours UV cycle at 70° C. and 4 hours condensation cycle at 50° C. The Weather-O-Meter was operated according to ASTM 155-1.

Example 25

Coating and Weatherable Primer 3.0 grams of Tinuvinl 130 was added to 150 grams of PR1180. The resulting composition was left to stir for four hours before coating application. This composition was applied as a primer by flow coating to a ¼" thick polycarbonate plaque. The primer was air dried for one hour before an application of a topcoat of example 7. The final coating was cured for 2 hours at 130° C.

Haze gain results from a Taber test using CS-10F wheels were: 2.7% haze at 50 revolutions and 12% haze after 200 revolutions. Formability of the coating was evaluated on a cylindrical mandrel and no crack was observed at 3" radius.

The weatherability of the coating was evaluated by both QUV and Weather-O-Meter. The coating doesn't show adhesion failure and crack until after 200 hours exposure to ultraviolet light in both accelerated weathering testers. The QUV was operated under the condition of 8 hours UV cycle at 70° C. and 4 hours condensation cycle at 50° C. The Weather-O-Meter was operated according to ASTM 155-1.

Example 26

Tintable Coating and Tinting on Nylon Lenses 26.4 grams of DI water were added dropwise to a stirring solution of 52.7 grams of A-187, 68.0 grams of GF20, and 147 grams of isopropanol. The mixture was stirred at room temperature overnight. 63 grams of PM glycol ether and 0.53 grams of a solution of PA-57, 10 weight percent in PM glycol ether, were added. The composition was left to stir for an additional 20 minutes after the addition to insure mixing.

This coating composition was applied by dip-coating to a Nylon lens at a withdrawal rate of 12 ipm. After air-drying for 30 minutes, the coating composition was cured for 2 hours at 112° C. to provide a cured film having a thickness of about 3.5 microns, a Bayer number of 2.30, and excellent steel wool abrasion resistance. Some of the lenses were tinted by diluting a bottle of BPI tint (approximately 100 grams) to about 900 grams with DI water and brought to 96° C. The coated article was immersed in the heated solution for 30 minutes. The coated article was removed from the tint solution and the light transmittance is measured, using a BYK Gardner Haze-gard Plus hazemeter. The coated article had around 11% light transmittance.

The weatherability of the coatings was evaluated by the QUV method B described in the specification. The non-tinted coating showed adhesion failure after 96 hours exposure. The tinted coating showed no adhesion failure or crack after 120 hours exposure. For the test method B, the QUV unit is set for repeating cycles of 4 hours UV-B exposure (0.8 W/m$^2$/nm) with a panel temperature of 48° C. and 4 hours of condensation with a panel temperature of 50° C.

Example 27

Tintable Coating Having a Blocked Isocyanate on Nylon/CR-39 Lenses 5.93 grams of DI water were added dropwise to a stirring solution of 11.9 grams of A-187, 15.2 grams of GF20, and 32.5 grams of isopropanol. The mixture was stirred at room temperature overnight. 19 grams of PM glycol ether, 2.61 grams of BL 3175A, and 0.12 grams of a solution of PA-57, 10 weight percent in PM glycol ether, were added. The composition was left to stir for an additional 20 minutes after the addition to insure mixing.

This coating composition was applied by dip-coating to a Nylon lens at a withdrawal rate of 12 ipm. After air-drying for 30 minutes, the coating composition was cured for 2 hours at 112° C. to provide a cured film having a thickness of about 4.0 microns, a Bayer number of 2.36, excellent steel wool abrasion resistance, and around 10% light transmittance after 30 min tinting in accordance with the procedure in Example 26. The weatherability of the coatings was evaluated by QUV method B in accordance with the procedure in the specification. Both of the tinted and non-tinted coatings showed no adhesion failure and crack after 120 hours exposure. For the test method B, the QUV unit is set for repeating cycles of 4 hours UV-B exposure (0.8 W/m$^2$/ nm) with a panel temperature of 48° C. and 4 hours of condensation with a panel temperature of 50° C.

This coating composition was also applied by dip-coating to an etched CR-39 lens at a withdrawal rate of 12 ipm. After air-drying for 30 minutes, the coating composition was cured for 2 hours at 112° C. to provide a cured film having a thickness of about 3.8 microns, a Bayer number of 1.93, excellent steel wool abrasion resistance, and around 16% light transmittance after 30 min tinting. The weatherability of the coatings was evaluated by QUV method B in accordance with the procedure in the specification. Both of the tinted and non-tinted coatings showed no adhesion failure after 72 hours exposure. For the test method B, the QUV unit is set for repeating cycles of 4 hours UV-B exposure (0.8 W/m²/nm) with a panel temperature of 48° C. and 4 hours of condensation with a panel temperature of 50° C.

Example 28

Tintable Coating Having a Blocked Isocyanate and Tinting on Nylon Lenses 26.4 grams of DI water were added dropwise to a stirring solution of 52.7 grams of A-187, 68.0 grams of GF20, and 73.5 grams of isopropanol. The mixture was stirred at room temperature overnight. 157 grams of PM glycol ether, 11.8 grams of BL 3175A, and 0.53 grams of a solution of PA-57, 10 weight percent in PM glycol ether, were added. The composition was left to stir for an additional 20 minutes after the addition to insure mixing.

This coating composition was applied by dip-coating to a Nylon lens at a withdrawal rate of 12 ipm. After air-drying for 30 minutes, the coating composition was cured for 2 hours at 112° C. to provide a cured film having a thickness of about 5.2 microns, a Bayer number of 2.38, excellent steel wool abrasion resistance, and around 12% light transmittance after 30 min tinting in accordance with the procedure of Example 26. The weatherability of the coatings was evaluated by QUV method B in accordance with the procedure in the specification. Both of the tinted and non-tinted coatings showed no adhesion failure and crack after 120 hours exposure. For the test method B, the QUV unit is set for repeating cycles of 4 hours UV-B exposure (0.8 W/m²/nm) with a panel temperature of 48° C. and 4 hours of condensation with a panel temperature of 50° C.

Example 29

Tintable Coating Having a Blocked Isocyanate on Nylon lens 260 grams of DI water were added dropwise to a stirring solution of 211 grams of A-187, 272 grams of GF20, and 764 grams of PM glycol ether. The mixture was stirred at room temperature overnight. 47.2 grams of BL 3175A and 2.12 grams of a solution of PA-57, 10 weight percent in PM glycol ether, were added. The composition was left to stir for an additional 20 minutes after the addition to insure mixing.

This coating composition was applied by dip-coating to a Nylon lens at a withdrawal rate of 12 ipm. After air-drying for 30 minutes, the coating composition was cured for 2 hours at 112° C. to provide a cured film having a thickness of about 4.9 microns, a Bayer number of 2.33, excellent steel wool abrasion resistance, and around 25% light transmittance after 30 min tinting in accordance with the procedure of Example 26. The weatherability of the coatings was evaluated by QUV method B in accordance with the procedure in the specification. Both of the tinted and non-tinted coatings showed no adhesion failure and crack after 120 hours exposure. For the test method B, the QUV unit is set for repeating cycles of 4 hours UV-B exposure (0.8 W/m²/nm) with a panel temperature of 48° C. and 4 hours of condensation with a panel temperature of 50° C.

Example 30

Tintable Coating Having a Blocked Isocyanate-Nylon/Trivex/ADC/MR® 8 Lens 87.0 grams of DI water were added dropwise to a stirring solution of 52.7 grams of A-187, 68.0 grams of GF20, and 87.0 grams of PM glycol ether. The mixture was stirred at room temperature overnight. 78.0 grams of PM glycol ether, 11.8 grams of BL 3175A, and 0.53 grams of a solution of PA-57, 10 weight percent in PM glycol ether, were added. The composition was left to stir for an additional 20 minutes after the addition to insure mixing.

This coating composition was applied by dip-coating to a Nylon lens at a withdrawal rate of 12 ipm. After air-drying for 30 minutes, the coating composition was cured for 2 hours at 112° C. to provide a cured film having a thickness of about 5.1 microns, a Bayer number of 2.48, excellent steel wool abrasion resistance, and around 24% light transmittance after 30 min tinting in accordance with the procedure of Example 26. The weatherability of the coatings was evaluated by QUV method B in accordance with the procedure in the specification. Both of the tinted and non-tinted coatings showed no adhesion failure and crack after 120 hours exposure. For the test method B, the QUV unit is set for repeating cycles of 4 hours UV-B exposure (0.8 W/m²/nm) with a panel temperature of 48° C. and 4 hours of condensation with a panel temperature of 50° C.

The weatherability of the coatings was also evaluated by QUV method A in accordance with the procedure in the specification. Both of the tinted and non-tinted coatings showed no adhesion failure and crack after 160 hours exposure. For the test method A, the QUV unit is set for repeating cycles of 4 hours UV-A exposure (0.8 W/m²/nm) and 4 hours of condensation with a panel temperature of 55° C.

This coating composition was also applied by dip-coating to a Trivex™ lens (obtained under brand name Trilogy® from Younger Optics, Torrance, Calif.) at a withdrawal rate of 12 ipm. After air-drying for 30 minutes, the coating composition was cured for 2 hours at 112° C. to provide a cured film having a thickness of about 5.4 microns, a Bayer number of 2.24, excellent steel wool abrasion resistance, and around 20% light transmittance after 30 min tinting in accordance with the procedure in Example 26. The weatherability of the coatings was evaluated by QUV method A in accordance with the procedure in the specification. Both of the tinted and non-tinted coatings showed no adhesion failure and crack after 160 hours exposure. For the test method A, the QUV unit is set for repeating cycles of 4 hours UV-A exposure (0.8 W/m²/nm) and 4 hours of condensation with a panel temperature of 55° C.

This coating composition was also applied by dip-coating to a ADC lens (CR-39) at a withdrawal rate of 12 ipm. After air-drying for 30 minutes, the coating composition was cured for 2 hours at 112° C. to provide a cured film having a thickness of about 5.2 microns, a Bayer number of 2.02, excellent steel wool abrasion resistance, and around 29% light transmittance after 30 min tinting in accordance with the procedure in Example 26. The weatherability of the coatings was evaluated by QUV method A in accordance with the procedure in the specification. Both of the tinted and non-tinted coatings showed no adhesion failure or crack after 160 hours exposure. For the test method A, the QUV unit is set for repeating cycles of 4 hours UV-A exposure (0.8 W/m$^2$/nm) and 4 hours of condensation with a panel temperature of 55° C.

This coating composition was also applied by dip-coating to a MR® 8 lens at a withdrawal rate of 12 ipm. After air-drying for 30 minutes, the coating composition was cured for 2 hours at 112° C. to provide a cured film having a thickness of about 5.01 microns, excellent steel wool abrasion resistance, and around 45% light transmittance after 30 min tinting in accordance with the procedure in Example 26. The weatherability of the coatings was evaluated by QUV method A in accordance with the procedure in the specification. The non-tinted coating showed no adhesion failure and crack after 160 hours exposure. The tinted coating showed adhesion failure after 112 hours exposure. For the test method A, the QUV unit is set for repeating cycles of 4 hours UV-A exposure (0.8 W/m$^2$/nm) and 4 hours of condensation with a panel temperature of 55° C.

Example 31

Tintable Coating Having a Blocked Isocyanate 87.0 grams of DI water were added dropwise to a stirring solution of 63.2 grams of A-187, 61.2 grams of GF20, and 87.0 grams of PM glycol ether. The mixture was stirred at room temperature overnight. 78.0 grams of PM glycol ether, 11.8 grams of BL 3175A, and 0.60 grams of a solution of PA-57, 10 weight percent in PM glycol ether, were added. The composition was left to stir for an additional 20 minutes after the addition to insure mixing.

This coating composition was applied by dip-coating to a Nylon lens at a withdrawal rate of 12 ipm. After air-drying for 30 minutes, the coating composition was cured for 2 hours at 112° C. to provide a cured film having a thickness of about 5.7 microns, a Bayer number of 2.41, excellent steel wool abrasion resistance, and around 23% light transmittance after 30 min tinting in accordance with the procedure of Example 26. The weatherability of the coatings was evaluated by QUV method B in accordance with the procedure in the specification. Both of the tinted and non-tinted coatings showed no adhesion failure and crack after 120 hours exposure. For the test method B, the QUV unit is set for repeating cycles of 4 hours UV-B exposure (0.8 W/m$^2$/nm) with a panel temperature of 48° C. and 4 hours of condensation with a panel temperature of 50° C.

Example 32

Tintable Coating Composition Having a Blocked Isocyanate 87.0 grams of DI water were added dropwise to a stirring solution of 73.7 grams of A-187, 47.6 grams of GF20, and 87.0 grams of PM glycol ether. The mixture was stirred at room temperature overnight. 78.0 grams of PM glycol ether, 11.8 grams of BL 3175A, and 0.60 grams of a solution of PA-57, 10 weight percent in PM glycol ether, were added. The composition was left to stir for an additional 20 minutes after the addition to insure mixing.

This coating composition was applied by dip-coating to a Nylon lens at a withdrawal rate of 12 ipm. After air-drying for 30 minutes, the coating composition was cured for 2 hours at 112° C. to provide a cured film having a thickness of about 5.7 microns, a Bayer number of 2.28, excellent steel wool abrasion resistance, and around 15% light transmittance after 30 min tinting in accordance with the procedure of Example 26. The weatherability of the coatings was evaluated by QUV method B in accordance with the procedure in the specification. Both of the tinted and non-tinted coatings showed no adhesion failure and crack after 120 hours exposure. For the test method B, the QUV unit is set for repeating cycles of 4 hours UV-B exposure (0.8 W/m$^2$/nm) with a panel temperature of 48° C. and 4 hours of condensation with a panel temperature of 50° C.

The weatherability of the coatings was also evaluated by QUV method A in accordance with the procedure in the specification. Both of the tinted and non-tinted coatings showed no adhesion failure and crack after 160 hours exposure. For the test method A, the QUV unit is set for repeating cycles of 4 hours UV-A exposure (0.8 W/m$^2$/nm) and 4 hours of condensation with a panel temperature of 55° C.

This coating composition was also applied by dip-coating to a Trivex™ lens at a withdrawal rate of 12 ipm. After air-drying for 30 minutes, the coating composition was cured for 2 hours at 112° C. to provide a cured film having a thickness of about 5.06 microns, a Bayer number of 2.2, excellent steel wool abrasion resistance, and around 3.6% light transmittance after 30 min tinting in accordance with the procedure in Example 26. The weatherability of the coatings was evaluated by QUV method A in accordance with the procedure in the specification. Both of the tinted and non-tinted coatings showed no adhesion failure and crack after 160 hours exposure. For the test method A, the QUV unit is set for repeating cycles of 4 hours UV-A exposure (0.8 W/m$^2$/nm) and 4 hours of condensation with a panel temperature of 55° C.

This coating composition was also applied by dip-coating to an ADC lens at a withdrawal rate of 12 ipm. After air-drying for 30 minutes, the coating composition was cured for 2 hours at 112° C. to provide a cured film having a thickness of about 5.15 microns, a Bayer number of 1.83, excellent steel wool abrasion resistance, and around 17% light transmittance after 30 min tinting in accordance with the procedure in Example 26. The weatherability of the coatings was evaluated by QUV method A in accordance with the procedure in the specification. Both of the tinted and non-tinted coatings showed no adhesion failure and crack after 160 hours exposure. For the test method A, the QUV unit is set for repeating cycles of 4 hours UV-A exposure (0.8 W/m$^2$/nm) and 4 hours of condensation with a panel temperature of 55° C.

This coating composition was also applied by dip-coating to a MR® 8 lens at a withdrawal rate of 12 ipm. After air-drying for 30 minutes, the coating composition was cured for 2 hours at 112° C. to provide a cured film having a thickness of about 4.89 microns, excellent steel wool abrasion resistance, and around 33% light transmittance after 30 min tinting in accordance with the procedure in Example 26. The weatherability of the coatings was evaluated by QUV method A in accordance with the procedure in the specification. The non-tinted coating showed no adhesion failure and crack after 160 hours exposure. The tinted coating showed adhesion failure after 112 hours exposure. For the test method A, the QUV unit is set for repeating cycles of 4 hours UV-A exposure (0.8 W/m$^2$/nm) and 4 hours of condensation with a panel temperature of 55° C.

Example 33

Primer/Tintable Coating

The coating composition of Example 30 was applied by dip-coating at a withdrawal rate of 12 ipm to a PR-1135 primed polycarbonate lens, which was dip-coated at withdrawal rate of 5 ipm. After air-drying for 30 minutes, the coating composition was cured for 2 hours at 112° C. to provide a cured film having a Bayer number of 2.24, excellent steel wool abrasion resistance, and around 6.5% light transmittance after 30 min tinting in accordance with the procedure in Example 26. The weatherability of the coatings was evaluated by QUV method B in accordance with the procedure in the specification. The non-tinted coating showed adhesion failure after 120 hours exposure. The tinted coating showed no adhesion failure or crack after 120 hours exposure. For the test method B, the QUV unit is set for repeating cycles of 4 hours UV-B exposure (0.8 W/m²/nm) with a panel temperature of 48° C. and 4 hours of condensation with a panel temperature of 50° C.

The weatherability of the coatings was also evaluated by QUV method A in accordance with the procedure in the specification. Both of the tinted and non-tinted coatings showed no adhesion failure and crack after 160 hours exposure. For the test method A, the QUV unit is set for repeating cycles of 4 hours UV-A exposure (0.8 W/m²/nm) and 4 hours of condensation with a panel temperature of 55° C.

Example 34

Primer Having a Crosslinking Agent/Tintable Coating 6.0 grams of B7986 was added to 400 grams of the primer PR-1135. The resulting composition was left to stir for one hour at room temperature. This composition was applied as a primer by dip-coating at a withdrawal rate of 5 ipm to a polycarbonate lens. The primer was air dried for 30 min before an application of a coating composition of Example 30. The Example 30 coating composition was applied by dip-coating at a withdrawal rate of 12 ipm. After air-drying for 30 minutes, the final coating composition was cured for 2 hours at 112° C. to provide a cured film having a Bayer number of 2.24, excellent steel wool abrasion resistance, and around 7.9% light transmittance after 30 min tinting in accordance with the procedure of Example 26. The weatherability of the coatings was evaluated by QUV method B in accordance with the procedure in the specification. The non-tinted coating showed adhesion failure after 120 hours exposure. The tinted coating showed no adhesion failure or crack after 120 hours exposure. For the test method B, the QUV unit is set for repeating cycles of 4 hours UV-B exposure (0.8 W/m²/nm) with a panel temperature of 48° C. and 4 hours of condensation with a panel temperature of 50° C.

The weatherability of the coatings was also evaluated by QUV method A in accordance with the procedure in the specification. Both of the tinted and non-tinted coatings showed no adhesion failure and crack after 160 hours exposure. For the test method A, the QUV unit is set for repeating cycles of 4 hours UV-A exposure (0.8 W/m²/nm) and 4 hours of condensation with a panel temperature of 55° C.

Example 35

Primer Having a Crosslinking Agent/Tintable Coating 12.0 grams of B17986 was added to 400 grams of the primer PR-1135. The resulting composition was left to stir for one hour at room temperature. This composition was applied as a primer by dip-coating at a withdrawal rate of 5 ipm to a polycarbonate lens. The primer was air dried for 30 min before an application of a topcoat of example 30. The Example 30 coating composition was applied by dip-coating at a withdrawal rate of 12 ipm. After air-drying for 30 minutes, the final coating composition was cured for 2 hours at 112° C. to provide a cured film having a Bayer number of 2.24, excellent steel wool abrasion resistance, and around 7.4% light transmittance after 30 min tinting in accordance with the procedure of Example 26. The weatherability of the coatings was evaluated by QUV method B in accordance with the procedure in the specification. The non-tinted coating showed adhesion failure after 120 hours exposure. The tinted coating showed no adhesion failure and crack after 120 hours exposure. For the test method B, the QUV unit is set for repeating cycles of 4 hours UV-B exposure (0.8 W/m²/nm) with a panel temperature of 48° C. and 4 hours of condensation with a panel temperature of 50° C.

The weatherability of the coatings was also evaluated by QUV method A in accordance with the procedure in the specification. Both of the tinted and non-tinted coatings showed no adhesion failure or crack after 160 hours exposure. For the test method A, the QUV unit is set for repeating cycles of 4 hours UV-A exposure (0.8 W/m²/nm) and 4 hours of condensation with a panel temperature of 55° C.

Example 36

Primer Having a Crosslinking Agent/Tintable Coating

The primer composition of example 35 was applied by dip-coating at a withdrawal rate of 5 ipm to a polycarbonate lens. The primer was air dried for 30 min before an application of a topcoat of example 32. The Example 32 coating composition was applied by dip-coating at a withdrawal rate of 12 ipm. After air-drying for 30 minutes, the final coating composition was cured for 2 hours at 112° C. to provide a cured film having a Bayer number of 2.15, excellent steel wool abrasion resistance, and around 20% light transmittance after 30 min tinting in accordance with the procedure of Example 26. The weatherability of the coatings was evaluated by QUV method A in accordance with the procedure in the specification. Both of the tinted and non-tinted coatings showed no adhesion failure or crack after 160 hours exposure. For the test method A, the QUV unit is set for repeating cycles of 4 hours UV-A exposure (0.8 W/m²/nm) and 4 hours of condensation with a panel temperature of 55° C.

Example 37

Primer Having Crosslinking Agent/Tintable Coating 18.0 grams of B17986 was added to 400 grams of the primer PR-1135. The resulting composition was left to stir for one hour at room temperature. This composition was applied as a primer by dip-coating at a withdrawal rate of 5 ipm to a polycarbonate lens. The primer was air dried for 30 min before an application of a topcoat of Example 30. The Example 30 coating composition was applied by dip-coating at a withdrawal rate of 12 ipm. After air-drying for 30 minutes, the final coating composition was cured for 2 hours at 112° C. to provide a cured film having a Bayer number of 2.24, excellent steel wool abrasion resistance, and around 8.4% light transmittance after 30 min tinting in accordance with the procedure of Example 26. The weatherability of the coatings was evaluated by QUV method B in accordance with the procedure in the specification. The non-tinted coating showed adhesion failure after 120 hours exposure. The tinted coating showed no adhesion failure or crack after 120 hours exposure with no adhesion failure and crack. For the test method B, the QUV unit is set for repeating cycles of 4 hours UV-B exposure (0.8 W/m$^2$/nm) with a panel temperature of 48° C. and 4 hours of condensation with a panel temperature of 50° C.

The weatherability of the coatings was also evaluated by QUV method A in accordance with the procedure in the specification. Both of the tinted and non-tinted coatings showed no adhesion failure or crack after 160 hours exposure. For the test method A, the QUV unit is set for repeating cycles of 4 hours UV-A exposure (0.8 W/m$^2$/nm) and 4 hours of condensation with a panel temperature of 55° C.

Example 38

Comparative Example Coating Having Blocked Isocyanate on Nylon Lens 87.0 grams of DI water were added dropwise to a stirring solution of 52.7 grams of A-187, 29.0 grams of itaconic acid, and 87.0 grams of PM glycol ether. The mixture was stirred at room temperature overnight. 78.0 grams of PM glycol ether, 11.8 grams of BL 3175A, and 0.53 grams of a solution of PA-57, 10 weight percent in PM glycol ether, were added. The composition was left to stir for an additional 20 minutes after the addition to insure mixing. This coating composition was applied by dip-coating to a Nylon lens at a withdrawal rate of 20 ipm. After air-drying for 30 minutes, the coating composition was cured for 2 hours at 112° C. A severe hazy film was obtained.

Example 39

Comparative Example Coating Having Blocked Isocyanate on Nylon Lens 87.0 grams of DI water were added dropwise to a stirring solution of 52.7 grams of A-187, 7.25 grams of itaconic acid, and 87.0 grams of PM glycol ether. The mixture was stirred at room temperature overnight. 78.0 grams of PM glycol ether, 11.8 grams of BL 3175A, and 0.53 grams of a solution of PA-57, 10 weight percent in PM glycol ether, were added. The composition was left to stir for an additional 20 minutes after the addition to insure mixing. This coating composition was applied by dip-coating to a Nylon lens at a withdrawal rate of 20 ipm. After air-drying for 30 minutes, the coating composition was cured for 2 hours at 112° C. to provide a cured film having a thickness of about 2.5 microns, a Bayer number of 1.22, poor steel wool abrasion resistance, and 3.7% light transmittance after 30 min tinting.

Example 40

Comparative Example Coating Having Blocked Isocyanate on Nylon Lens 87.0 grams of DI water were added dropwise to a stirring solution of 52.7 grams of A-187, 22.3 grams of succinic anhydride, and 87.0 grams of PM glycol ether. The mixture was stirred at room temperature overnight. 78.0 grams of PM glycol ether, 11.8 grams of BL 3175A, and 0.53 grams of a solution of PA-57, 10 weight percent in PM glycol ether, were added. The composition was left to stir for an additional 20 minutes after the addition to insure mixing. This coating composition was applied by dip-coating to a Nylon lens at a withdrawal rate of 20 ipm. After air-drying for 30 minutes, the coating composition was cured for 2 hours at 112° C. A severe hazy film was obtained.

Example 41

Comparative Example Coating Having Blocked Isocyanate on Nylon Lens 87.0 grams of DI water were added dropwise to a stirring solution of 52.7 grams of A-187, 5.57 grams of succinic anhydride, and 87.0 grams of PM glycol ether. The mixture was stirred at room temperature overnight. 78.0 grams of PM glycol ether, 11.8 grams of BL 3175A, and 0.53 grams of a solution of PA-57, 10 weight percent in PM glycol ether, were added. The composition was left to stir for an additional 20 minutes after the addition to insure mixing. This coating composition was applied by dip-coating to a Nylon lens at a withdrawal rate of 20 ipm. After air-drying for 30 minutes, the coating composition was cured for 2 hours at 112° C. to provide a cured film having a thickness of about 2.2 microns, a Bayer number of 0.56, poor steel wool abrasion resistance, and 3.2% light transmittance after 30 min tinting.

It will be understood that various changes may be made without departing from the scope of the invention, which is not to be considered limited to what is described in the description.

What is claimed is:

1. A composition which, when applied to a substrate and cured, provides a transparent, tintable coating on the substrate, comprising:
    an aqueous-organic solvent mixture having hydrolysis products and partial condensates of at least one of an epoxy functional silane and a diol functional organopolysiloxane, and at least one multifunctional crosslinker, wherein said multifunctional crosslinker comprises a silylated multifunctional anhydride, and wherein said at least one of said epoxy functional silane and said diol functional organopolysiloxane is present in a molar ratio to said multifunctional crosslinker from about 10:1 to about 1:10;
    an amount of water sufficient to hydrolyze said at least one of said epoxy functional silane and said diol functional organopolysiloxane and said multifunctional crosslinker; and
    a blocked isocyanate.

2. The composition as claimed in claim 1 wherein said at least one of said epoxy functional silane and said diol functional organopolysiloxane is present in a molar ratio to said multifunctional crosslinker of about 6:1 to about 1:6.

3. The composition as claimed in claim 1 wherein said at least one of said epoxy functional silane and said diol functional organopolysiloxane is present in a molar ratio to said multifunctional crosslinker of about 3:1 to about 1:3.

4. The composition as claimed in claim 1 wherein said blocked isocyanate comprises from about 1 percent by weight to about 30 percent by weight of the solids of said coating composition.

5. The composition as claimed in claim 1 wherein said blocked isocyanate comprises from about 2 percent by weight to about 15 percent by weight of the solids of said coating composition.

6. The composition as claimed in claim 1 wherein said blocked isocyanate comprises from about 3 percent by weight to about 10 percent by weight of the solids of said coating composition.

7. The composition as claimed in claim 1 wherein said blocked isocyanate is selected from at least one of Desmodur BI 3175, Desmodur BI 3272, Desmodur BI 3370, Desmodur BI 3475, Desmodur BI 4265, Trixene BI 7982, Trixene 7983, Trixene BI 7984, Trixene BI 7980, Trixene BI 7960, and Trixene BI 7950.

8. The composition as claimed in claim 1 wherein said blocked isocyanate comprises Desmodur BI 3175.

9. The composition as claimed in claim 1 wherein said coating has a Bayer number of greater than about 1.5.

10. The composition as claimed in claim 1 wherein said coating has a Bayer number of greater than about 2.

11. The composition as claimed in claim 1 wherein said coating exhibits no adhesion failure or cracking under QUV method A and QUV method B test conditions for at least 72 hours.

12. The composition as claimed in claim 1 wherein said coating exhibits no adhesion failure or cracking under QUV method A and QUV method B test conditions for at least 120 hours.

13. The composition as claimed in claim 1 wherein the solvent constituent of said aqueous-organic solvent mixture comprises from about 40 to about 98 percent by weight of the composition.

14. The composition as claimed in claim 1 wherein the solvent constituent of said aqueous-organic solvent mixture is selected from the group consisting of an ether, a glycol or a glycol ether, a ketone, an ester, a glycolether acetate, alcohols having the formula ROH where R is an alkyl group containing from 1 to about 10 carbon atoms, and mixtures thereof.

15. The composition as claimed in claim 1 wherein the solvent constituent of said aqueous-organic solvent mixture is selected from the group consisting of glycols, ethers, glycol ethers having the formula $R^1—(OR^2)_x—OR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

16. The composition as claimed in claim 1 further comprising at least one of tetrafunctional silanes, disilanes, and alkyl silanes.

17. The composition as claimed in claim 1 further comprising colloidal silica.

18. The composition as claimed in claim 1 wherein said epoxy functional silane is represented by the formula $R^3{}_xSi(OR^4)_{4-x}$, wherein:

x is an integer of 1, 2 or 3;

$R^3$ is H, an alkyl group, a functionalized alkyl group, an alkylene group, an aryl group, an alkyl ether, and combinations thereof containing from 1 to about 10 carbon atoms and having at least 1 epoxy functional group;

$R^4$ is H, an alkyl group containing from 1 to about 5 carbon atoms, an acetyl group, a $—Si(OR^5)_{3-y}R^6{}_y$ group where y is an integer of 0, 1, 2, or 3, or combinations thereof;

$R^5$ is H, an alkyl group containing from 1 to about 5 carbon atoms, an acetyl group, or another $—Si(OR^5)_{3-y}R^6{}_y$ group and combinations thereof; and $R^6$ is H, an alkyl group, a functionalized alkyl group, an alkylene group, an aryl group, an alkyl ether, or combinations thereof containing from 1 to about 10 carbon atoms.

19. An article, comprising:

a substrate and a tintable coating formed on at least one surface of said substrate by curing a coating composition, comprising:

an aqueous-organic solvent mixture having hydrolysis products and partial condensates of at least one of an epoxy functional silane and a diol functional organopolysiloxane, and at least one multifunctional crosslinker, wherein said multifunctional crosslinker comprises a silylated multifunctional anhydride, and wherein said at least one of said epoxy functional silane and said diol functional organopolysiloxane is present in a molar ratio to said multifunctional crosslinker from about 10:1 to 1:10;

an amount of water sufficient to hydrolyze said at least one of said epoxy functional silane and said diol functional organopolysiloxane and said multifunctional crosslinker; and a blocked isocyanate.

20. The article as claimed in claim 19 further comprising at least one primer disposed on said at least one surface of said substrate between said substrate and said coating.

21. The article as claimed in claim 20 wherein said at least one primer comprises a polyurethane dispersion based primer.

22. The article as claimed in claim 20 wherein said at least one primer comprises a polyurethane dispersion based primer having a crosslinking agent.

23. The article as claimed in claim 22 wherein said crosslinking agent is selected from the group consisting of a blocked isocyanate, aziridine resin, epoxy resin, and melamine resin.

24. The article as claimed in claim 22 wherein said polyurethane dispersion based primer further comprises an ultraviolet light absorber.

25. The article as claimed in claim 22 wherein said crosslinking agent comprises about 1 percent to about 30 percent by weight of the solids of said polyurethane dispersion based primer.

26. The article as claimed in claim 19 wherein said tintable coating has a thickness between about 0.2 µm to about 20 µm.

27. The article as claimed in claim 19 wherein said tintable coating has a thickness between about 1.5 µm to about 10 µm.

28. The article as claimed in claim 19 wherein said tintable coating has a thickness between about 2.5 µm to about 7 µm.

29. The article as claimed in claim 19 wherein said substrate is selected from acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, and poly(diethylene glycol-bis-allyl carbonate).

30. The article as claimed in claim 29 wherein said substrate comprises a lens.

31. An article, comprising:
a substrate, a primer disposed on at least one surface of the substrate, and a tintable coating formed on at least a portion of said primer curing a coating composition, wherein:
said coating composition comprises:
an aqueous-organic solvent mixture having hydrolysis products and partial condensates of at least one of an epoxy functional silane and a diol functional organopolysiloxane, and at least one multifunctional crosslinker, wherein said multifunctional crosslinker comprises a silylated multifunctional anhydride, and wherein said at least one of said epoxy functional silane and said diol functional organopolysiloxane is present in a molar ratio to said multifunctional crosslinker from about 10:1 to 1:10; and
an amount of water sufficient to hydrolyze said at least one of said epoxy functional silane and said diol functional
organopolysiloxane and said multifunctional crosslinker; and
said primer comprises a polyurethane dispersion based primer having a crosslinking agent.

32. The article as claimed in claim 31 wherein said tintable coating exhibits no adhesion failure or cracking under QUV method A and QUV method B test conditions for at least about 72 hours.

* * * * *